United States Patent
Kim et al.

(10) Patent No.: US 9,414,339 B2
(45) Date of Patent: Aug. 9, 2016

(54) METHOD AND APPARATUS FOR TRANSMITTING REFERENCE SIGNAL IN WIRELESS COMMUNICATION SYSTEM

(71) Applicant: LG ELECTRONICS INC., Seoul (KR)

(72) Inventors: Bonghoe Kim, Anyang-si (KR); Yunjung Yi, Anyang-si (KR); Suckchel Yang, Anyang-si (KR); Hanbyul Seo, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 14/380,042

(22) PCT Filed: Mar. 19, 2013

(86) PCT No.: PCT/KR2013/002260
§ 371 (c)(1),
(2) Date: Aug. 20, 2014

(87) PCT Pub. No.: WO2013/141583
PCT Pub. Date: Sep. 26, 2013

(65) Prior Publication Data
US 2016/0057716 A1 Feb. 25, 2016

Related U.S. Application Data

(60) Provisional application No. 61/612,414, filed on Mar. 19, 2012, provisional application No. 61/635,878, filed on Apr. 20, 2012, provisional application No. 61/635,879, filed on Apr. 20, 2012, provisional application No. 61/652,166, filed on May 26, 2012.

(51) Int. Cl.
*H04W 56/00* (2009.01)
*H04L 5/00* (2006.01)
(Continued)

(52) U.S. Cl.
CPC ....... *H04W 56/0005* (2013.01); *H04J 11/0069* (2013.01); *H04L 5/0007* (2013.01); *H04L 5/0048* (2013.01); *H04L 27/2647* (2013.01); *H04W 56/00* (2013.01)

(58) Field of Classification Search
CPC ............. H04W 56/00; H04W 56/0045; H04B 7/2662; H04J 2011/0096
See application file for complete search history.

(56) References Cited

U.S. PATENT DOCUMENTS

| | | |
|---|---|---|
| 2005/0124352 A1 | 6/2005 | Fernandez-Corbaton et al. |
| 2008/0253484 A1 | 10/2008 | Kakura et al. |

(Continued)

FOREIGN PATENT DOCUMENTS

| | | |
|---|---|---|
| WO | 2010/123301 | 10/2010 |
| WO | 2011/103309 | 8/2011 |

OTHER PUBLICATIONS

PCT International Application No. PCT/KR2013/002260, Written Opinion of the International Searching Authority dated Jun. 27, 2013, 1 page.

(Continued)

*Primary Examiner* — Hassan Phillips
*Assistant Examiner* — Prenell Jones
(74) *Attorney, Agent, or Firm* — Lee, Hong, Degerman, Kang & Waimey; Jonathan Kang; Richard Salfelder

(57) ABSTRACT

Disclosed are a method and an apparatus for transmitting a reference signal. A method for receiving a reference signal may comprise the steps of: a subframe including a plurality of resource blocks (RB) and a plurality of OFDM symbols receiving a synchronization signal; and determining the number of RBs which are included in one precoding resource block group (PRB), on the basis of the size of a total system bandwidth, wherein the RBs included in the PRG may include information to which identical precoding has been applied. The synchronization signal is received by six core RBs from the plurality of RBs, and the reference signal can be received by at least one OFDM symbol from the plurality of OFDM symbols, excluding the first and second OFDM symbols, through a plurality of PRGs including the six core RBs. As a result, a channel can be accurately estimated on the basis of the reference signal.

12 Claims, 26 Drawing Sheets

(51) Int. Cl.
*H04L 27/26* (2006.01)
*H04J 11/00* (2006.01)

(56) References Cited

U.S. PATENT DOCUMENTS

| | | |
|---|---|---|
| 2010/0157924 A1 | 6/2010 | Prasad et al. |
| 2010/0296429 A1 | 11/2010 | Han et al. |
| 2011/0081933 A1 | 4/2011 | Suh et al. |
| 2011/0103506 A1 | 5/2011 | Moon et al. |
| 2011/0211537 A1 | 9/2011 | Sivanesan et al. |
| 2011/0243005 A1 | 10/2011 | Sun et al. |
| 2011/0268101 A1 | 11/2011 | Wang et al. |
| 2011/0274077 A1 | 11/2011 | Yamada et al. |
| 2011/0286346 A1 | 11/2011 | Barbieri et al. |
| 2012/0002740 A1 | 1/2012 | Han et al. |
| 2012/0046056 A1 | 2/2012 | Luo et al. |
| 2012/0155362 A1 | 6/2012 | Montojo et al. |
| 2012/0208547 A1 | 8/2012 | Geirhofer et al. |
| 2012/0236776 A1 | 9/2012 | Zhang et al. |
| 2013/0044678 A1 | 2/2013 | Qu et al. |
| 2013/0094411 A1 | 4/2013 | Zhang et al. |
| 2013/0163530 A1* | 6/2013 | Chen ............ H04W 72/04 370/329 |
| 2013/0194931 A1* | 8/2013 | Lee ............ H04L 5/0053 370/241 |
| 2013/0195086 A1 | 8/2013 | Xu et al. |

OTHER PUBLICATIONS

United States Patent and Trademark Office U.S. Appl. No. 14/379,122, Office Action dated Apr. 6, 2016, 19 pages.
United States Patent and Trademark Office U.S. Appl. No. 14/382,708, Office Action dated May 18, 2016, 21 pages.

* cited by examiner

FIG. 15
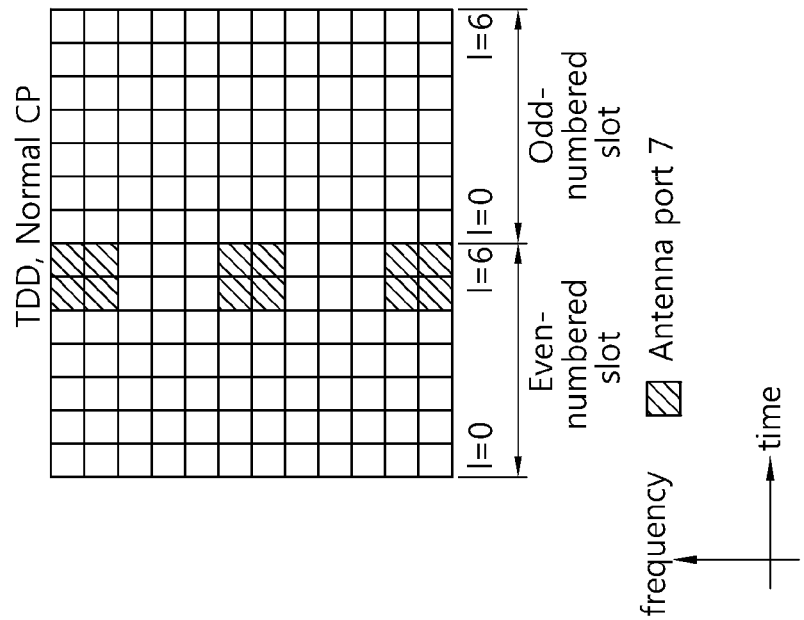
(A)
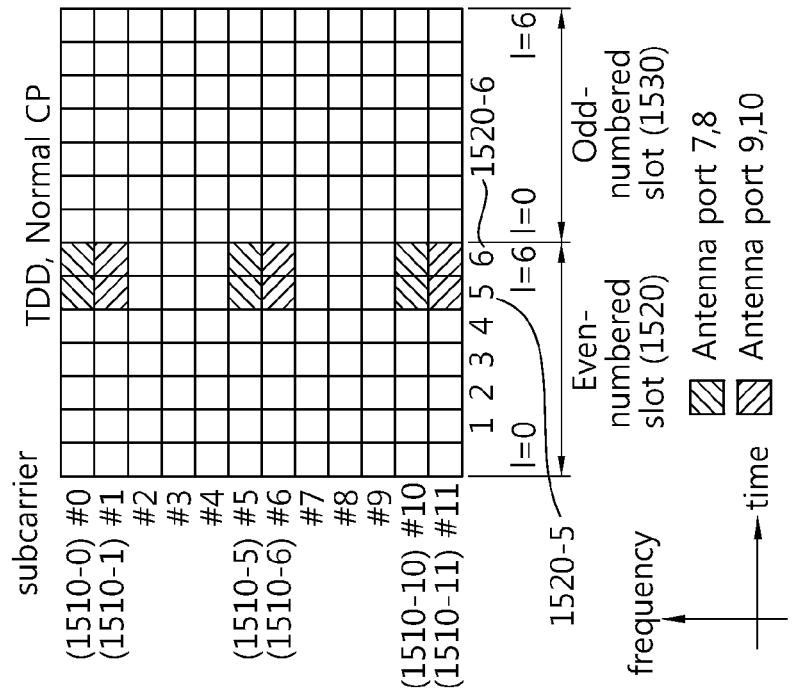
(B)

METHOD AND APPARATUS FOR TRANSMITTING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2013/002260, filed on Mar. 19, 2013, which claims the benefit of U.S. Provisional Application Ser. Nos. 61/612,414, filed on Mar. 19, 2012, 61/635,878, filed on Apr. 20, 2012, 61/635,879, filed on Apr. 20, 2012 and 61/652,166, filed on May 26, 2012, the contents of which are all hereby incorporated by reference herein in their entirety.

BACKGROUND OF THE INVENTION

1. Field of the Invention

The present invention relates to wireless communication, and more particularly, to a method and an apparatus for transmitting a reference signal.

2. Related Art

Intensive research is conducted in order to improve performance in terms of a capacity, transmission coverage, coordination between cells, and cost. Introduction of various technologies including small cell enhancement, macro cell enhancement, a new carrier type, machine type communication, and the like as a technological term in LTE release 12 for the performance improvement.

Enhancement of the capacity and the transmission coverage targeted by the LTE release 12 may be achieved by small cell enhancement based on inter-site carrier aggregation and inter-LTE-wireless local area network (WLAN) integration and the macro cell enhancement. As the size of the cell decreases, inter-cell movement of a UE frequently occurs, and as a result, the quantity of traffics signaled when the UE moves may increase. In order to solve the problem, signaling transmitted to a core network in a radio access network (RAN) is decreased by using the small cell enhancement to optimize a small cell.

The new carrier type (NCT) is a frame type which is newly defined differently from a legacy frame configuration. The NCT may be a carrier type optimized to the small cell, but may be applied to even the macro cell. The NCT may decrease overhead which occurs by transmitting a cell-specific reference signal (CRS) and demodulate a downlink control channel based on a demodulation reference signal (DM-RS). Energy of a base station may be saved and interference which occurs in a heterogeneous network (HetNet) by newly defining the NCT. Further, reference signal overhead which occurs at the time of transmitting data may be decreased by using the NCT. In more detail, the NCT maintains the existing frame structure (e.g., CP length, subframe structure, and duplex mode), but may be defined by a carrier backward compatible (to el-11 and below UEs), which is different in a structure of an actually transmitted reference signal.

SUMMARY OF THE INVENTION

The present invention provides a method for transmitting a reference signal.

The present invention also provides an apparatus for performing the method for transmitting a reference signal.

In an aspect, a method for receiving a reference signal in a multi-antenna system is provided. The method includes: receiving a synchronization signal in a subframe including a plurality of resource blocks (RBs) and a plurality of OFDM symbols; receiving a reference signal in the subframe; and determining the number of RBs included in one Precoding Resource block Group (PRG) based on the size of a total system bandwidth, and the RBs included in the PRG include information to which the same precoding is applied, the synchronization signal includes a PSS and an SSS, the PSS is received in a first OFDM symbol among the plurality of OFDM symbols, the SSS is received in a second OFDM symbol among the plurality of OFDM symbols, a cell identifier is acquired based on the PSS and the SSS, the synchronization signal is received in center 6 RBs among the plurality of RBs, and the reference signal is received through the plurality of PRGs including the center 6 RBs in at least one OFDM symbol among OFDM symbols other than the first and second OFDM symbols. The reference signal may be a signal created based on a UE identifier, and when the size of the PRG is 2 physical resource block (PRB), the reference signal may be received in a frequency band of 7 RBs including the 6 RBs. The reference signal may be a signal created based on a UE identifier, and when the size of the PRG is 3 physical resource block (PRB), the reference signal may be received in a frequency band of 9 RBs including the 6 RBs.

In another aspect, a UE receiving a reference signal in a wireless communication system is provided. The UE includes: a processor, and the processor is implemented to receive determine a synchronization signal in a subframe including a plurality of resource blocks (RBs) and a plurality of OFDM symbols, receive the reference signal in the subframe, and determine the number of RBs included in one Precoding Resource block Group (PRG) based on the size of a total system bandwidth, in which the RBs included in the PRG include information to which the same precoding is applied, the PSS is received in a first OFDM symbol among the plurality of OFDM symbols, the SSS is received in a second OFDM symbol among the plurality of OFDM symbols, a cell identifier is acquired based on the PSS and the SSS, the synchronization signal is received in center 6 RBs among the plurality of RBs, and the reference signal is received through the plurality of PRGs including the center 6 RBs in at least one OFDM symbol among OFDM symbols other than the first and second OFDM symbols. The reference signal may be a signal created based on a UE identifier, and when the size of the PRG is 2 physical resource block (PRB), the reference signal may be received in a frequency band of 7 RBs including the 6 RBs. The reference signal may be a signal created based on a UE identifier, and when the size of the PRG is 3 physical resource block (PRB), the reference signal may be received in a frequency band of 9 RBs including the 6 RBs.

Accurate channel estimation can be achieved based on a reference signal.

BRIEF DESCRIPTION OF THE DRAWINGS

FIGS. 14 to 15 are conceptual diagrams illustrating a URS pattern according to an embodiment of the present invention.

DESCRIPTION OF EXEMPLARY EMBODIMENTS

A wireless device may be fixed or movable and may be called other terms such as user equipment (UE), a mobile station (MS), a mobile terminal (MT), a user terminal (UT), a subscriber station (SS), a personal digital assistant (PDA), a wireless modem, a handheld device, and the like. Alternatively, the wireless device may be a device that supports only data communication, such as a machine-type communication (MTC) device.

A base station (BS) generally represents a fixed station that communicates with the wireless device and may be called different terms such as an evolved-NodeB (eNB), a base transceiver system (BTS), an access point, and the like.

Hereinafter, it is described that the present invention is applied based on $3^{rd}$ Generation Partnership Project (3GPP) long term evolution (LTE) based on 3GPP technical specification (TS) release 8 or 3GPP LTE-A based on 3GPP TS release 10. This is just an example and the present invention may be applied to various wireless communication networks. Hereinafter, LTE includes LTE and/or LTE-A.

Figure 1:
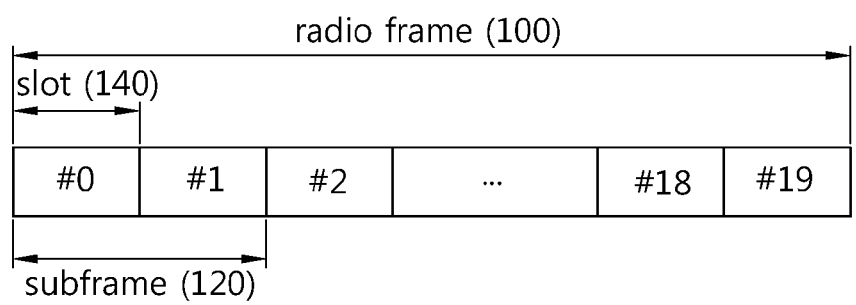
FIG. 1 illustrates the structure of a radio frame in $3^{rd}$ Generation Partnership Project (3 GPP) long term evolution (LTE).

FIG. 1 illustrates the structure of a radio frame in $3^{rd}$ Generation Partnership Project (3GPP) long term evolution (LTE).

The structure of the radio frame 10 in the 3GPP LTE may refer to Clause 5 of 3rd Generation Partnership Project (3GPP) TS 36.211 V8.2.0 (2008 March) "Technical Specification Group Radio Access Network; Evolved Universal Terrestrial Radio Access (E-UTRA); Physical channels and modulation (Release 8)". Referring to FIG. 1, the radio frame 100 is constituted by 10 subframes, and one subframe 120 is constituted by two slots 140. In the radio frame 100, an index may be applied according to the slot 140 of slots #0 to #19 or the index may be applied according to the subframe 120 of subframes #0 to #9. Subframe #0 may include slot #0 and slot #1.

A time required to transmit one subframe 120 is referred to as a transmission time interval (TTI). The TTI may be a scheduling unit for data transmission. For example, the length of one radio subframe may be 10 ms, the length of one subframe may be 1 ms, and the length of one slot may be 0.5 ms.

One slot includes a plurality of orthogonal frequency division multiplexing (OFDM) symbols in a time domain, and a plurality of subcarriers in a frequency domain. Since the 3GPP LTE uses the OFDMA in the downlink, the OFDM symbol is used to express one symbol period and may be called other name according to a multiple access scheme. For example, when a single carrier-frequency division multiple access (SC-FDMA) is used as an uplink multiple access scheme, the OFDM symbol may be called an SC-FDMA symbol. A resource block (RB) includes a plurality of contiguous subcarriers in one slot as a resource allocation unit. The resource block will be disclosed in detail in FIG. 2. The structure of the radio frame 100 disclosed in FIG. 1 is one embodiment for a frame structure. Accordingly, the number of subframes 120 included in the radio frame 100, the number of slots 140 included in the subframe 120, or the number of OFDM symbols included in the slot 140 is diversifiedly changed to be defined as a new radio frame format.

The 3GPP LTE defines that one slot includes 7 OFDM symbols when a normal cyclic prefix (CP) is used, and one slot includes 7 OFDM symbols when an extended CP is used.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be advantageously acquired from the uplink channel response. In the TDD scheme, since an entire frequency bands are time-divided into the uplink transmission and the downlink transmission, the downlink transmission by the base station and the uplink transmission by the user equipment may not simultaneously be performed. In the TDD system in which the uplink transmission and the downlink transmission are divided by the unit of the subframe, the uplink transmission and the downlink transmission are performed in different subframes.

Figure 2:
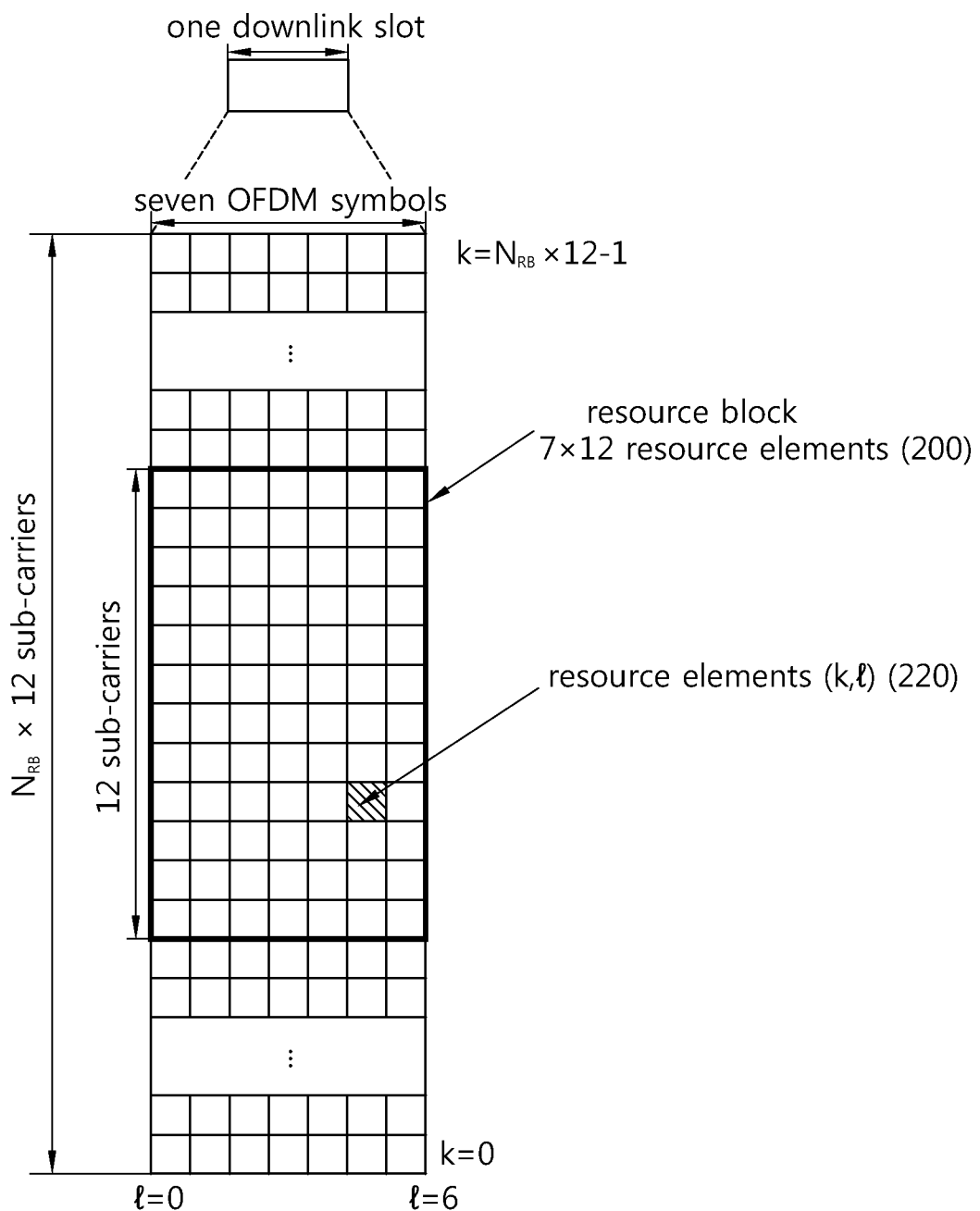
FIG. 2 illustrates one example of a resource grid for a downlink slot.

FIG. 2 illustrates one example of a resource grid for a downlink slot.

The downlink slot includes a plurality of OFDM symbols in the time domain, and includes $N_{RB}$ resource blocks in the frequency domain. NRB which is the number of resource blocks included in the downlink slot is subordinate to a downlink transmission bandwidth set in a cell. For example, in an LTE system, the NRB may be any one of 6 to 110 according to the used transmission bandwidth. One resource block 200 includes a plurality of subcarriers in the frequency domain. The structure of an uplink slot may also be the same as that of the downlink slot.

Each element on the resource grid is called a resource element 220. The resource element on the resource grid may be identified by a pair of indexes (k,l) in the slot. Herein, k (k=0, . . . , NRB×12−1) represents a subcarrier index in the frequency domain, and l (l=0, . . . , 6) represents an OFDM symbol index in the time domain.

Herein, it is exemplified that one resource block 200 is 7×12 resource elements 220 which are constituted by 7 OFDM symbols in the time domain and 12 subcarriers in the frequency domain, but the number of the OFDM symbols and the number of the subcarriers in the resource block 220 are not limited thereto. The number of the OFDM symbols and the number of the subcarriers may be variously changed depending on the length of the CP, frequency spacing, and the like. For example, in the case of a normal CP, the number of OFDM symbols is 7 and in the case of an extended CP, the number of OFDM symbols is 6. As the number of subcarriers in one OFDM symbol, one of 128, 256, 512, 1024, 1536, and 2048 may be selected and used.

Figure 3:
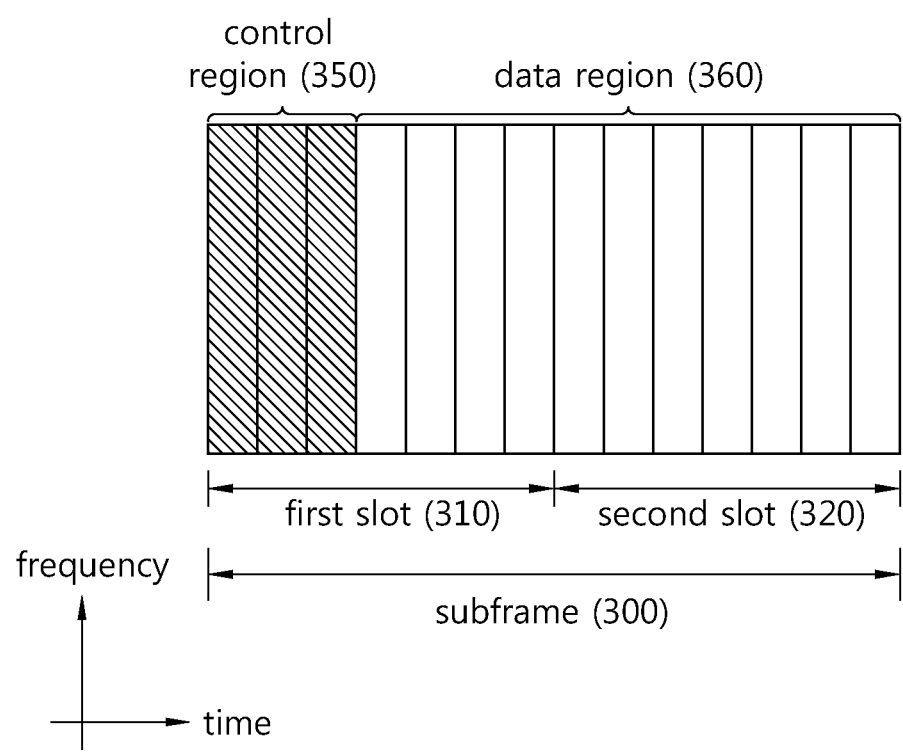
FIG. 3 illustrates the structure of a downlink subframe.

FIG. 3 illustrates the structure of a downlink subframe.

The downlink subframe 300 includes two slots 310 and 320 in the time domain and each of the slots 310 and 320 includes 7 OFDM symbols in the normal CP. Preceding maximum 3 OFDM symbols (maximum 4 OFDM symbols for a 1.4 Mhz bandwidth) of a first slot 310 in the subframe 300 are a control region 350 to which control channels are allocated, and residual OFDM symbols become a data region 360 to which a physical downlink shared channel (PDSCH) is allocated.

A PDCCH may transmit resource allocation and a transmission format of a downlink-shared channel (DL-SCH), resource allocation information of an uplink shared channel (UL-SCH), paging information on a PCH, system information on the DL-SCH, resource allocation of a higher layer control message such as a random access response transmitted on the PDSCH, a set of transmission power control commands for individual UEs in a predetermined UE group, and activation of a voice over Internet protocol (VoIP). A plurality of PDCCH regions may be transmitted in the control region 350, and the user equipment may monitor the plurality of PDCCHs. The PDCCH is transmitted on aggregation of one or several contiguous control channel elements (CCEs). The CCE is a logical allocation unit used to provide to the coding rate to the PDCCH depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines the PDCCH format according to the downlink control information (DCI) to be sent to the terminal and affixes a cyclic redundancy check (CRC) to the control information. A unique identifier (radio network temporary identifier (RNTI)) is masked on the CRC according to an owner or a purpose of the PDCCH. In the case of a PDCCH for a specific UE, a unique identifier of the UE, for example, a cell (C)-RNTI may be masked on the CRC. Alternatively, in the case of a PDCCH for a paging message, a paging indication identifier, for example, a paging (P)-RNTI may be masked on the CRC. In the case of a PDCCH for a system information block (SIB), a system information (SI)-RNTI may be masked on the CRC. A random access (RA)-RNTI may be masked on the CRC in order to indicate the random access response which is a response to transmission of a random access preamble of the UE.

Figure 4:
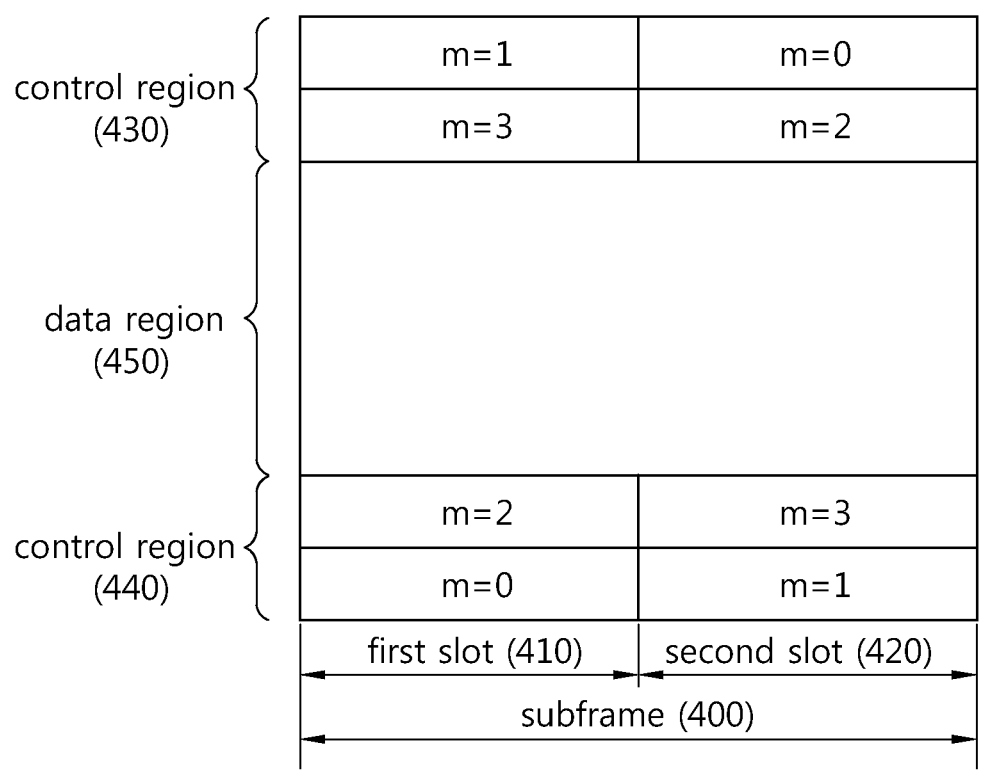
FIG. 4 illustrates the structure of an uplink subframe.

FIG. 4 illustrates the structure of an uplink subframe.

The uplink subframe may be divided into control regions 430 and 440 and a data region 450 in the frequency domain. A physical uplink control channel (PUCCH) for transmitting the uplink control information is allocated to the control regions 430 and 440. A physical uplink shared channel (PUSCH) for transmitting data is allocated to the data region 450. When indicated in a higher layer, the user equipment may support simultaneous transmission of the PUSCH and the PUCCH.

A PUCCH for one user equipment is allocated to a resource block (RB) pair in the subframe 400. Resource blocks that belong to the RB pair occupy different subcarriers in first and second slots 410 and 420, respectively. A frequency occupied by the resource blocks that belongs to the RB pair allocated to the PUCCH is changed based on a slot boundary. This means that the RB pair allocated to the PUCCH is frequency-hopped on the slot boundary. The user equipment transmits the uplink control information through different subcarriers with time to acquire a frequency diversity gain. m is a position index representing a logical frequency domain position of the resource block pair allocated to the PUCCH in the subframe.

The uplink control information transmitted on the PUCCH includes a hybrid automatic repeat request (HARQ) acknowledgement (ACK)/non-acknowledgement (NACK), a channel quality indicator (CQI) indicating a downlink channel status, a scheduling request (SR) which is an uplink radio resource allocation request, and the like.

The PUSCH is mapped in the uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the control information. For example, the control information multiplexed to the data may include a CQI, a precoding matrix indicator (PMI), HARQ, a rank indicator (RI), and the like. Alternatively, the uplink data may be constituted by only the control information.

In recent years, as one method for transmitting data at high data rate, a carrier aggregation (CA) method that transmits data by using a set of a plurality of component carriers (CCs) as a transmission frequency band is discussed. Carrier aggregation as a technology that aggregates two or more component carriers (CCs) is introduced in LTE-Advanced in order to support aggregation of a transmission bandwidth of 100 MHz and a spectrum. The carrier aggregation technology supports scalability to enable aggregation up to a wide frequency band such as 100 MHz.

Figure 5:
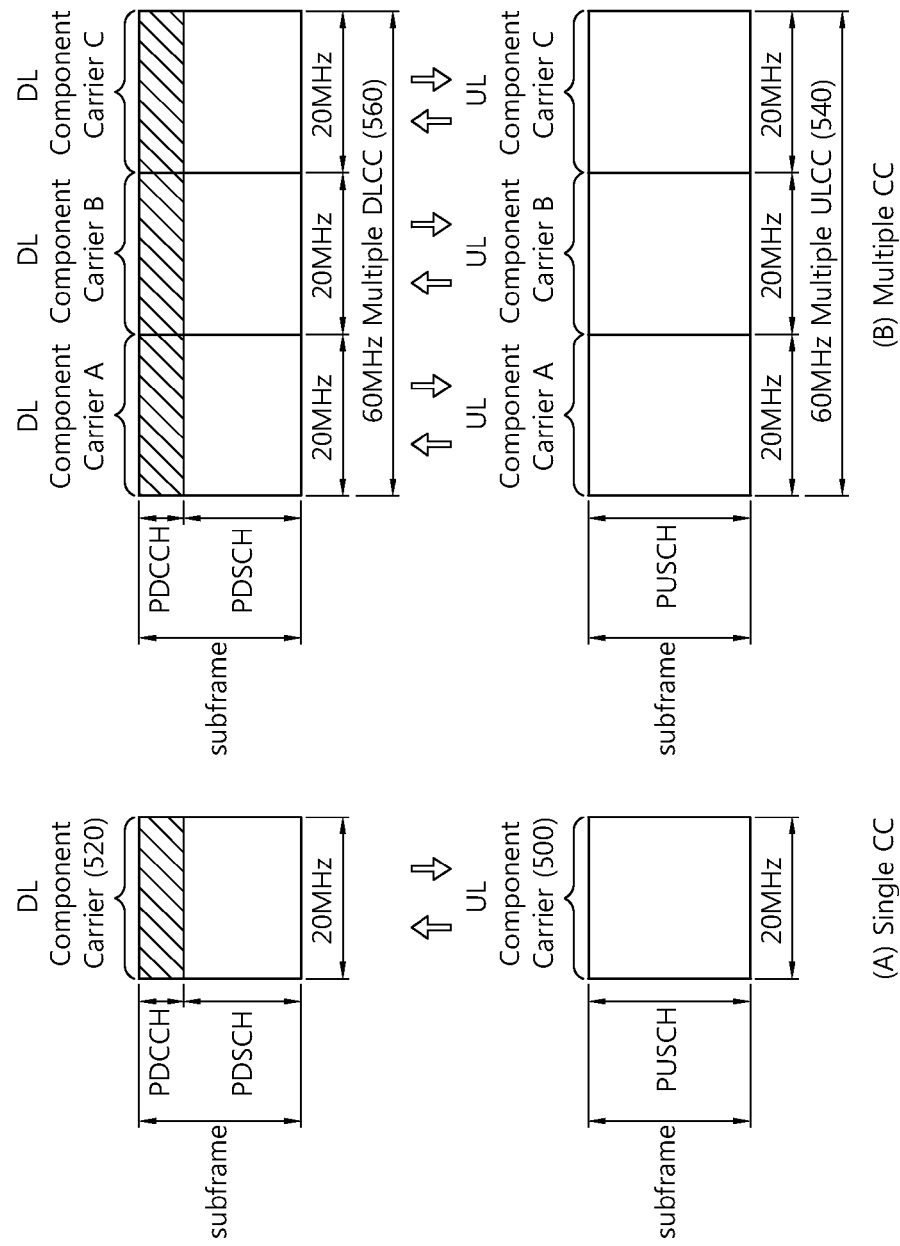
FIG. 5 is a conceptual diagram illustrating carrier aggregation.

FIG. 5 is a conceptual diagram illustrating carrier aggregation.

FIG. 5(A) illustrates one single component carrier (CC). One CC may be an uplink frequency band 500 and a downlink frequency band 520 of 20 MHz. FIG. 5(B) illustrates multiple CCs. The plurality of CCs may be, for example, an uplink frequency band 540 and a downlink frequency band 560 of 60 MHz in which the uplink frequency band and the downlink frequency band of 20 MHz.

The base station performs the carrier aggregation to transmit data to the UE through the plurality of downlink CCs. The base station may enable the downlink transmission by using N downlink CCs. In this case, if the UE may receive downlink data only through M (M is a natural number which is equal to or smaller than N) downlink CCs, the UE may receive only the downlink data transmitted from the base station through M downlink CCs.

Additionally, the base station may set a frequency bandwidth corresponding to L (L is a natural number which is equal to or smaller than M and N) downlink CCs as a main CC and operate the frequency bandwidth. The user equipment may preferentially monitor and receive data which the base station transmits through the main CC. When the carrier aggregation is performed, the CC may be distinguished according to the cell.

When the carrier aggregation is performed by using a CC of a primary cell (P-cell) and a CC of a secondary cell (S-cell), a carrier corresponding to the CC of the P-cell is referred to as a primary cell component carrier (PCC) and a carrier corresponding to the CC of the S-cell is referred to as a secondary cell component carrier (SCC).

Figure 6:
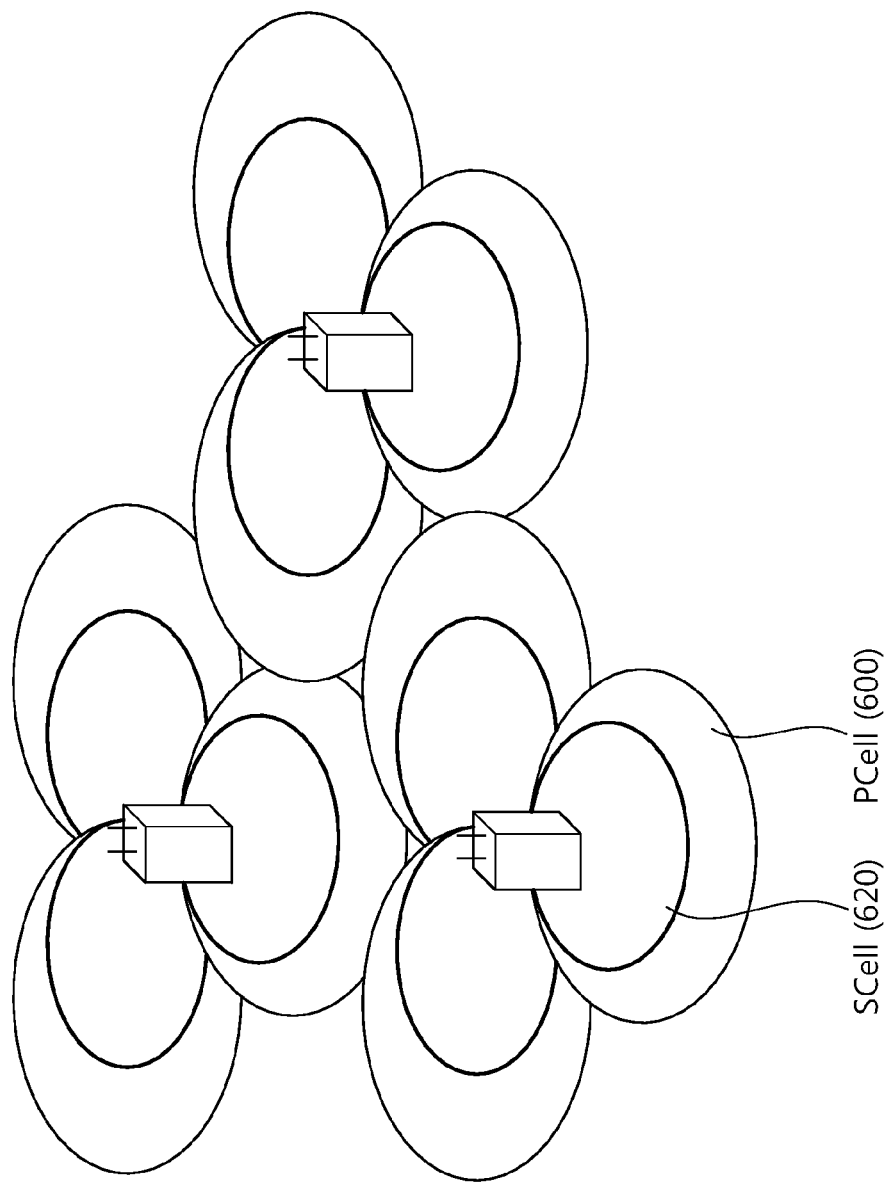
FIG. 6 is a conceptual diagram illustrating a P-cell and an S-cell.

FIG. 6 is a conceptual diagram illustrating a P-cell and an S-cell.

Referring to FIG. 6, the base station may perform the carrier aggregation based on the PCC of the P-cell 600 and the SCC of one or more S-cells 620. When two or more cells exist, the base station determines one cell as the P-cell 600 and residual cells may be determined as the S-cell 620. The base station may aggregate the CCs of the determined P-cell 600 and S-cell 620 and transmit data to the UE by using the aggregated frequency bandwidth. The UE may also transmit data to the base station by using the aggregated frequency bandwidth. The P-cell 600 and the S-cell 620 disclosed in FIG. 6 as one exemplary pattern of scenarios in which the P-cell 600 and the S-cell 620 are disposed illustrate the case where transmission coverage of data transmitted based on the PCC of the P-cell 600 is larger than that of data transmitted based on the SCC of the S-cell 620.

The UE may perform radio resource control (RRC) connection with a network through the PCC of the P-cell 600. Further, the UE may attempt the random access to the base station through a physical random access channel (PRACH) based on a signal signaled through the PCC. That is, the UE may perform an initial connection establishment process or a connection re-establishment process to the base station through the PCC in a carrier aggregation environment.

The SCC of the S-cell 620 may be used to provide an additional radio resource. In order to perform carrier aggregation of adding the SCC to the PCC, the UE should perform neighbor cell measurement of acquiring information on a neighbor cell. The base station may determine whether to aggregate the SCC to the PCC based on the neighbor cell measurement performed by the UE.

The base station may transmit PDCCH data to the UE through the PCC. The PDCCH data may include PDSCH data allocation information transmitted through a downlink PCC band and a downlink SCC band and information to acknowledge data transmission through the uplink.

The P-cell 600 and the S-cell 620 may perform the carrier aggregation through configuration and activation operations, and transmit and receive data through an aggregated frequency band.

Figure 7:
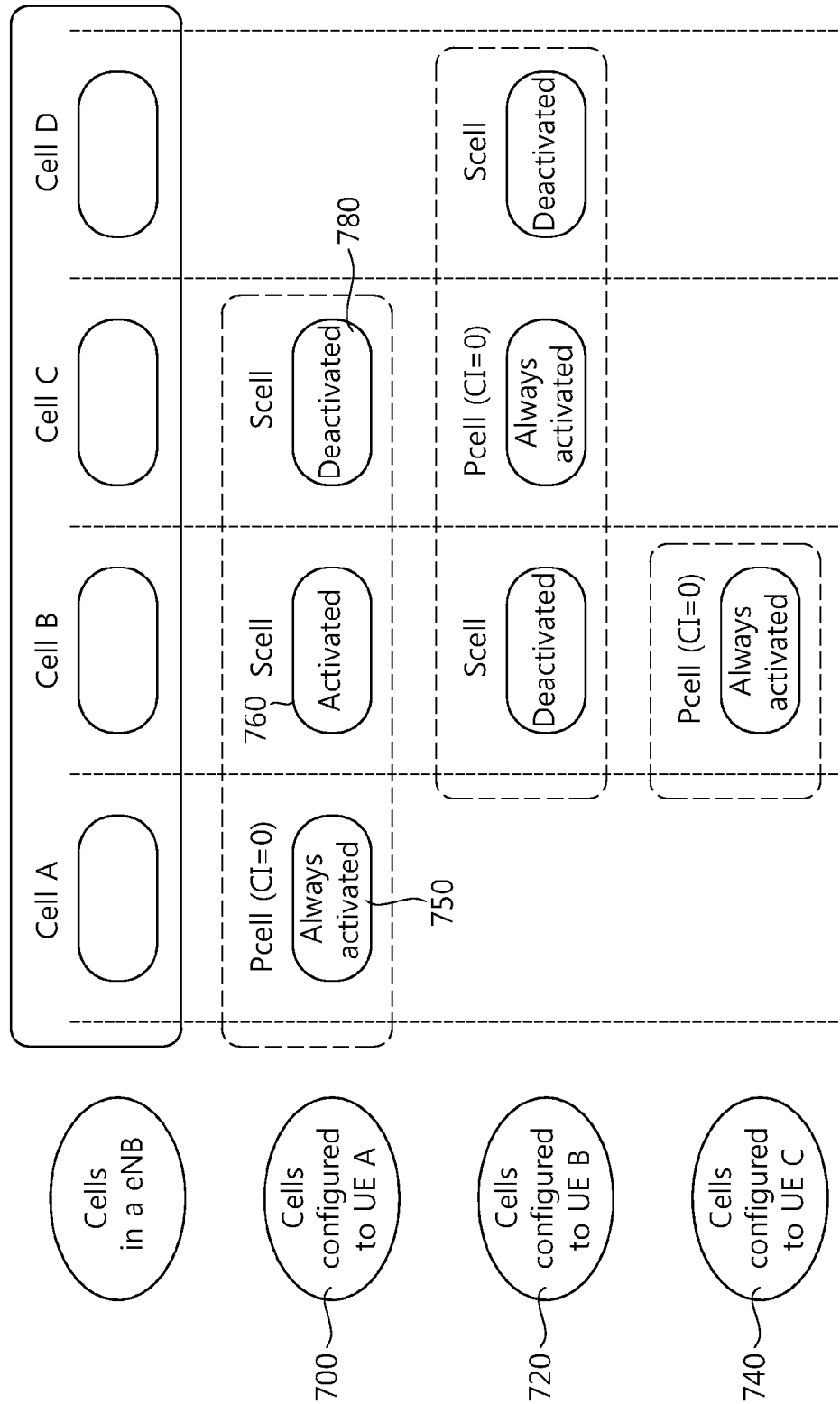
FIG. 7 is a conceptual diagram illustrating a method for setting and activating a cell at the time of performing the carrier aggregation.

FIG. 7 is a conceptual diagram illustrating a method for setting and activating a cell at the time of performing the carrier aggregation.

Referring to FIG. 7, configured cells 720, 740, and 760 indicates a cell determined so as to perform the carrier aggregation for a CC of a corresponding cell among cells of the base station based on a measurement report transmitted by the UE. The configured cells 720, 740, and 760 may be configured differently for UEs (UE A, UE B, and UE C).

Among the configured cells 720, 740, and 760, cells in which uplink transmission and downlink transmission are performed are referred to as activated cells 750 and 760. The P-cell may be a continuously activated cell 750. A cell index of the P-cell is indicated as 0. The UE may report channel state information (CSI) and transmit the SRA in order to transmit the channel state information of the downlink and the downlink based on the CCs of the configured cells 720, 740, and 760.

A de-activated cell 780 is a cell configured in such a manner that the uplink transmission and the downlink transmission are not performed through the CC of the corresponding cell based on a command of the base station or a timer operation. The CSI reporting and the SRS transmission of the UE may also be stopped in the de-activated cell 780.

As described above, in order to perform the carrier aggregation, the UE should perform the neighbor cell measurement of acquiring the information on the neighbor cell. The UE may use a common RS (cell specific RS) transmitted through the SCC as a reference signal for preforming radio resource management (RRM) measurement of the neighbor cell.

Carriers included in the SCC may be divided into a synchronized carrier and a non-synchronized carrier.

Figure 8:
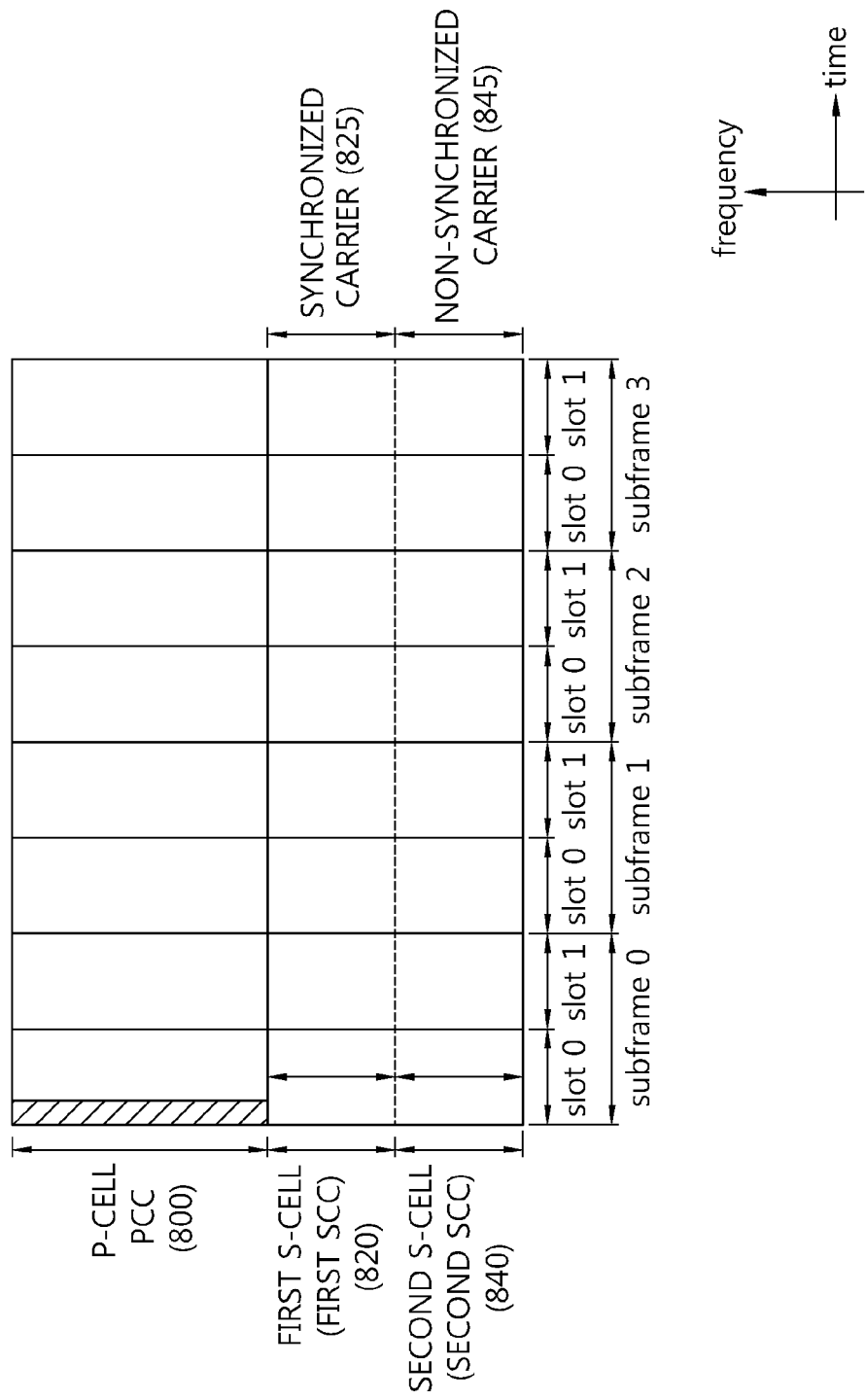
FIG. 8 is a conceptual diagram illustrating a synchronized carrier and a non-synchronized carrier according to an embodiment of the present invention.

FIG. 8 is a conceptual diagram illustrating a synchronized carrier and a non-synchronized carrier according to an embodiment of the present invention.

FIG. 8 is a conceptual diagram illustrating a synchronized carrier and a non-synchronized carrier.

In FIG. 8, it is assumed that two SCCs 820 and 840 are aggregated in one PCC 800 to be used for the downlink transmission. A first SCC 820 may be a synchronized carrier 825 and a second SCC 840 may be a non-synchronized carrier 845.

The synchronized carrier 825 is a carrier that does not transmit a signal to perform synchronization to the carrier. The UE synchronizes data transmitted through the synchronized carrier 825 based on a synchronized signal transmitted in a synchronization reference carrier to receive the data. The synchronization reference carrier will be described below.

The non-synchronized carrier 845 is a carrier that transmits the signal to perform synchronization to the carrier. A UE that operates in the non-synchronized carrier 845 may acquire synchronization of data based on the synchronization signal received in the non-synchronized carrier 845 without the synchronized signal transmitted in other carrier which is the same as the synchronization reference carrier.

In more detail, the non-synchronized carrier 845 may transmit a signal (for example, a primary synchronized signal (PSS)/a secondary synchronized signal (SSS)) required for synchronization. A UE that receives the non-synchronized carrier 845 may perform synchronization based on a reference signal included in the non-synchronized carrier 845.

However, the synchronized carrier 825 is a carrier that does not transmit the signal for synchronization. The UE that receives the data transmitted through the synchronized carrier 825 may perform synchronization based on a synchronized signal transmitted in not the synchronized carrier 825 but the synchronization reference carrier.

The synchronization reference signal is a carrier included in a frequency band of a reference cell. The reference cell is an adjacent cell that is operated in a frequency band having similar propagation and channel characteristics as the cell that transmits the synchronization carrier.

Figure 9:
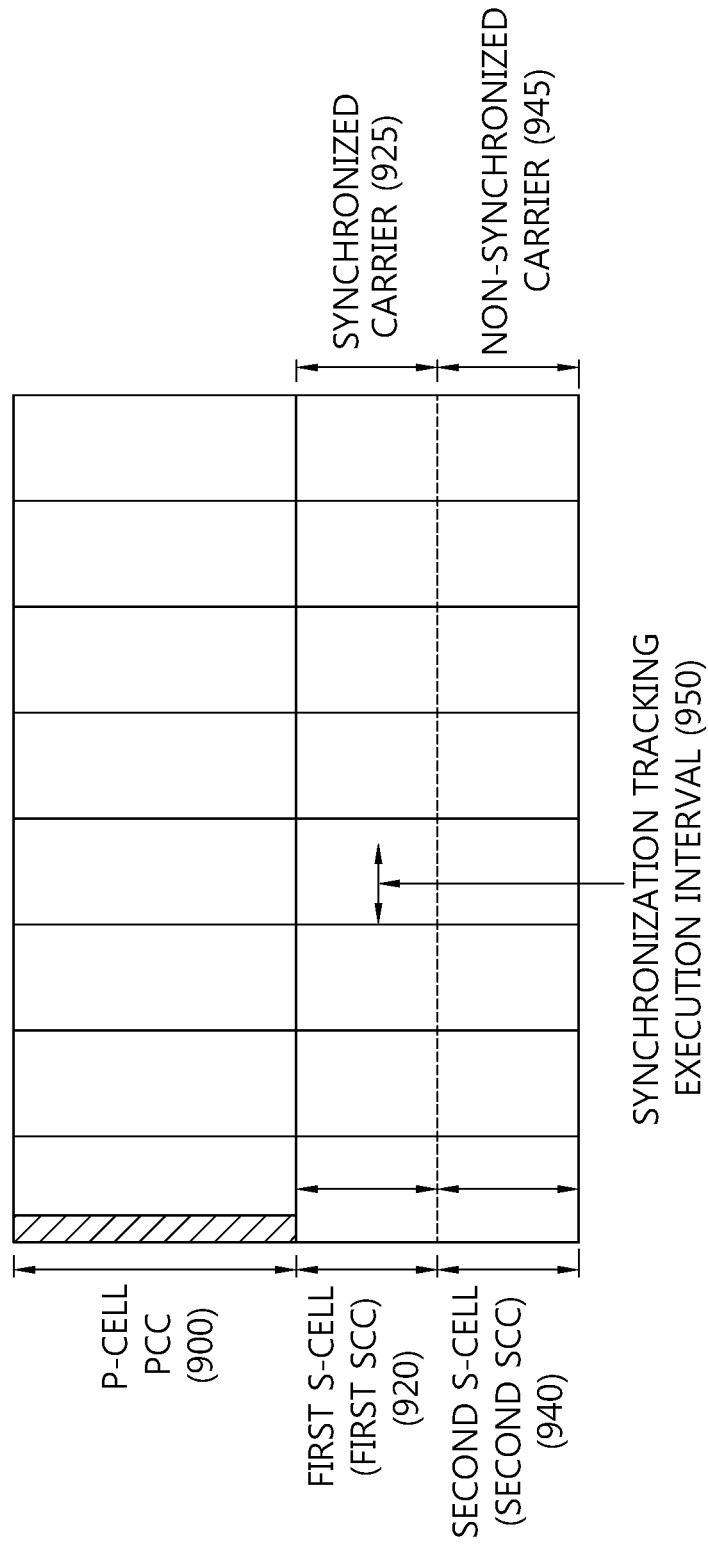
FIG. 9 is a conceptual diagram illustrating a synchronization method of a terminal that receives the synchronized carrier according to the embodiment of the present invention.

FIG. 9 is a conceptual diagram illustrating a synchronization method of a terminal that receives the synchronous carrier according to the embodiment of the present invention.

In FIG. 9, it is assumed that two SCCs 920 and 940 are aggregated in one PCC 900 to be used for the downlink transmission. A first SCC 920 may be a synchronized carrier 925 and a second SCC 940 may be a non-synchronized carrier 945. It is assumed and described that the second SCC 940 is a synchronization reference carrier 945 of the first SCC 920.

Referring to FIG. 9, a UE that receives data transmitted through the first SCC 920 may perform synchronization based on a synchronization signal transmitted in the synchronization reference carrier 945. The UE may perform synchronization tracking by receiving the synchronization signal transmitted through the synchronization reference carrier 945 during a specific time interval 950. The specific time interval 950 during which the synchronization reference carrier 945 is received may be a predetermined periodic time interval. For example, an interval during the synchronization signal is transmitted through the synchronization reference carrier 945 may be set as the specific time interval 950. The UE may stop a series of operations of receiving downlink data through the synchronized carrier 925 during the interval during which the synchronization tracking is performed.

The UE may perform synchronization and RPM measurement for the synchronized carrier 925 based on the signal transmitted through the synchronization reference carrier 945. The RPM measurement may include reference signal received power (RSRP) measurement, reference single received quality (RSRQ) measurement, path loss measurement, and the like.

The synchronization and the RRM measurement using the synchronized carrier and the synchronization reference carrier 945 may be performed by using various methods described below.

(1) Method 1: A UE that is operated based on the synchronized carrier 925 may perform the synchronization and the RRM measurement (for example, the reference signal received power (RSRP) measurement, the reference single received quality (RSRQ) measurement, and the path loss measurement) by using the synchronization signal and the reference signal transmitted through the synchronization reference carrier 945.

(2) Method 2: The UE that is operated based on the synchronized carrier 925 may perform synchronization by using the synchronization signal transmitted through the synchronization reference carrier 945. The RRM measurement of the UE may be performed based on a channel state information-reference signal (CSI-RS) or a cell specific reference signal (CRS) which is a reference signal transmitted to the UE through the synchronized carrier 925.

(3) Method 3: The UE that is operated based on the synchronized carrier 925 may perform the synchronization and the RRM measurement by using the synchronization signal and the reference signal transmitted through the synchronization reference carrier 945. Further, simultaneously, the UE may perform the RRM measurement based on the CSI-RS or CRS which is the reference signal transmitted to the UE through the synchronized carrier 925.

(4) Method 4: The UE that is operated based on the synchronized carrier 925 may perform the synchronization and the RRM measurement by using the synchronization signal and the reference signal transmitted through the synchronization reference carrier 945. Further, simultaneously, the UE may perform the RRM measurement by using the CSI-RS or CRS which is the reference signal transmitted through the synchronized carrier 925.

In Method 4, some (for example, the reference signal received power measurement) of the RRM measurement method may be performed and some of the RRM measurement method may be performed by using the synchronized carrier 925.

The UE should search for the S-cell to be measured and acquire synchronization for the RRM measurement for the SCC of the S-cell. If the SCC to be measured is the synchronized carrier 925, the UE should receive the synchronization signal from the synchronization reference carrier 945 of the reference cell. Accordingly, the reference cell should be one cell among cells which the UE may search for and in which the UE may receive the signal. If a specific cell is indicated to the UE as the reference cell by a higher layer signal, the UE may perform the synchronization and/or the RRM measurement based on the signal transmitted from the indicated reference cell.

As described above, whether to aggregate the PCC and the SCC is determined by neighbor cell measurement by the UE. Accordingly, the UE needs to perform the RRM measurement for even the SCC which is the synchronized carrier 925. However, as described above, since the base station does not transmit the synchronization single through the synchronized carrier 925, the UE may not directly measure the radio resource management through the synchronized carrier 925. Accordingly, as described above, the UE may the RRM measurement for the SCC which is the synchronized carrier 925 by using the synchronization reference carrier 945 instead of the synchronized carrier 925. That is, after the RRM measurement for the SCC 925 is performed based on the synchronization reference carrier 945 of the reference cell, whether to carrier-aggregate the SCC 925 may be determined.

That is, the base station may perform configuration and activation for the synchronized carrier 925 based on a result of the RRM measurement using the synchronization reference carrier 945 performed by the UE. As a method for configuring or activating the synchronized carrier 925 and the synchronization reference carrier 945, the following method may be used. Configuring the carrier means performing the carrier aggregation for the carrier based on a measurement report for the carrier. Activating the carrier means actually transmitting and receiving the PDSCH data and the PDCCH data through the carrier after configuring the carrier.

(1) Method 1: A method in which the synchronized carrier 925 and the synchronization reference carrier 945 are independently configured/activated.

In Method 1, whether the synchronous carrier 925 and the synchronization reference carrier 945 are configured and activated may be independently determined.

(2) Method 2: A method of simultaneously configuring the synchronous carrier 925 and the synchronization reference carrier 945.

(2)-1 Method 2-1: A method of independently activating the synchronous carrier 925 and the synchronization reference carrier 945.

(2)-2 Method 2-2: A method of continuously simultaneously activating the synchronous carrier 925 and the synchronization reference carrier 945.

In Method 2, the synchronous carrier 925 and the synchronization reference carrier 945 are simultaneously configured. However, whether the synchronous carrier 925 and the synchronization reference carrier 945 are activated may not be simultaneously determined.

In Methods 1 and 2, whether a carrier used for the data transmission is the synchronous carrier 925 at the time of configuring and activating the synchronous carrier 925 may be notified to the UE. As another method, when the UE performs the RRM measurement for the synchronous carrier 925, the base station may transmit information on the synchronized carrier 925 to the UE.

When the synchronous carrier 925 and the synchronization reference carrier 945 are simultaneously configured, if the length of a cyclic prefix (CP) of a subframe transmitted through the synchronization reference carrier 945 is larger than the length of a CP transmitted through the synchronization carrier 925, even though the UE acquires timing synchronization based on the synchronization signal transmitted in the synchronization reference carrier 945, it may not be assured whether the timing synchronization of the data transmitted through the synchronized carrier is accurate.

Figure 10:
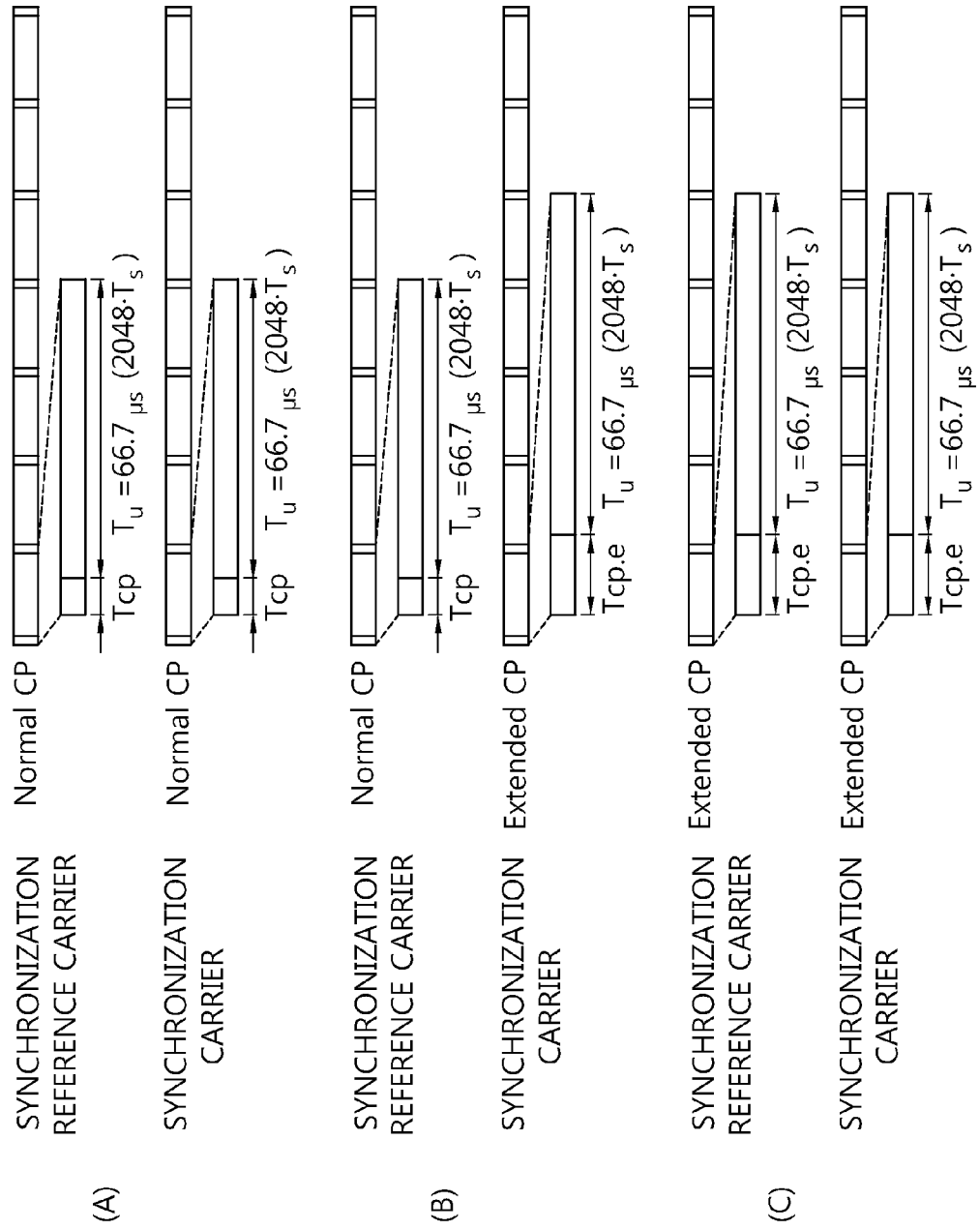
FIG. 10 is a conceptual diagram illustrating an available CP combination of a subframe transmitted in the synchronized carrier and a synchronous reference carrier according to the embodiment of the present invention.

FIG. 10 is a conceptual diagram illustrating an available CP combination of a subframe transmitted in the synchronized carrier and a synchronization reference carrier according to the embodiment of the present invention.

In FIG. 10, a combination is illustrated, in which subframes transmitted in the synchronized carrier and the synchronization reference carrier may be used as the CP.

In order for the UE to acquire the timing synchronization based on the synchronization reference carrier, the length of the CP of the subframe transmitted through the synchronization reference carrier should be equal to or smaller than the length of the CP of the subframe transmitted through the synchronized carrier. That is, only three CP combinations corresponding to FIGS. 10(A), 10(B), and 10(C) may be used as the CP of the subframe transmitted through the synchronization reference carrier and the synchronized carrier. Three CP combinations will be described below.

(1) The subframe transmitted through the synchronization reference carrier is a normal CP and the subframe transmitted through the synchronized carrier is the normal CP (2) The subframe transmitted through the synchronization reference carrier is a normal CP and the subframe transmitted through the synchronized carrier is an extended CP (3) The subframe transmitted through the synchronization reference carrier is the extended CP and the subframe transmitted through the synchronized carrier is the extended CP When the synchronization reference carrier and the synchronized carrier are together configured and activated, an independent cell ID may not be granted to the S-cell in which the SCC is the synchronized carrier. The cell ID of the S-cell in which the SCC is the synchronized carrier may be an ID of the reference cell, the ID of the P-cell, or a value set in a higher layer, which is substituted with the cell ID. The cell ID is not granted to the S-cell in which the SCC is the synchronized carrier, and as a result, a problem of cell deployment, which may occur due to insufficiency in cell ID may be solved.

When such a cell ID granting method is used, a scrambling sequence of the PDSCH/demodulation reference signal (DM-RS) using the cell ID as a sequence creation parameter may be similarly initialized. That is, a signal transmitted through the synchronization reference carrier and a signal transmitted through the synchronized carrier may initialize the scrambling sequence by using a parameter based on the same cell ID.

For initializing the scrambling sequence of the PDSCH of the synchronized carrier, initializing of the scrambling sequence of a PDSCH corresponding to an q∈{0,1}-th codeword may be expressed as shown in Equation 1 below.

$$c_{init} = \{n_{RNTI} \cdot 2^{14} + q \cdot 2^{13} + \lfloor n_s/2 \rfloor \cdot 2^9 + A \text{ for PDSCH} \qquad \langle\text{Equation 1}\rangle$$

Herein, A is a parameter based on the cell ID. Accordingly, A may vary depending on a value of the ID of the S-cell in which the SCC is the synchronized carrier. As described above, the ID of the S-cell may be an ID of the S-cell in which the SCC is the synchronization reference carrier, the ID of the P-cell, or a value set in the higher layer, which is substituted with the cell ID.

By the same method, initializing the scrambling sequence of the DM-RS may be expressed as shown in Equation 2 below.

$$c_{init}=(\lfloor n_s/2 \rfloor+1)\cdot(B+1)\cdot 2^{16}+n_{SCID} \qquad \text{<Equation 2>}$$

In Equation 2, B is also the parameter based on the cell ID. Accordingly, B may vary depending on the value of the ID of the S-cell in which the SCC is the synchronized carrier. As described above, the ID of the S-cell may be an ID of the S-cell in which the SCC is the synchronization reference carrier, the ID of the P-cell, or a value set in the higher layer, which is substituted with the cell ID.

By the same method, initializing the scrambling sequence of the CSI-RS may be expressed as shown in Equation 3 below.

$$c_{init}=2^{10}\cdot(7\cdot(n_s+1)+l+1)\cdot(2\cdot C+1)+2\cdot C+N_{CP} \qquad \text{<Equation 3>}$$

Herein, C may also vary depending on the value of the ID of the S-cell in which the SCC is the synchronized carrier similarly as A and B. As described above, the ID of the S-cell may be an ID of the S-cell in which the SCC is the synchronization reference carrier, the ID of the P-cell, or a value set in the higher layer, which is substituted with the cell ID.

That is, the S-cell in which the SCC is the synchronized carrier may prevent the insufficiency in cell ID by using the cell ID of the reference cell, the cell ID of the P-cell, or the value set in the higher layer, which is substituted with the cell ID, without independently using the cell ID.

The UE may determine whether the SCC is in an in-synch state or in an out-of-synch state. When a reference signal having sufficient power for the UE to stably decode the PDCCH data is transmitted, the UE assumes that a radio link is in the in-synch. In the inverse case, it may be assumed that the radio link is in the out-of-synch.

The UE may monitor the reference signal transmitted through the downlink in order to determine whether the radio link is in the in-synch. The UE may determine whether to decode the PDCCH data by measuring an RRM measurement parameter such as reference signal received power (RSRP). For example, respective use equipments may measure the received reference signal received power by determining a threshold value of the individual reference signal received power. The UE may determine whether to decode the received PDCCH data based on the received reference signal received power.

According to the embodiment of the present invention, when the SCC as the synchronized carrier is independently configured and activated, whether data transmitted through the radio link is in the out-of-synch may be determined based on the P-cell. That is, when it is determined whether the radio link is in the out-of-synch based on the P-cell by monitoring whether the radio link is in the out-of-synch, it may regarded that the radio link for all S-cells is also in the out-of-synch. Further, when it is determined that the radio link is in the in-synch based on the P-cell, it may be regarded that the radio link for all S-cells is in the in-synch.

Additionally, when the S-cell in which the SCC is the synchronized carrier is activated, the S-cell may be deactivated according to a measurement result of the synchronization reference carrier.

Since the base station does not a legacy PDCCH through a specific carrier, a new-type PDCCH (for example, an enhanced (e)-PDCCH) may be transmitted without satisfying backward compatibility. In this case, the following reference may be used as a reference for the use equipment to determine whether the SCC is in the out-of-synch. Hereinafter, it is assumed that the new-type PDCCH is the e-PDCCH.

(1) Method 1: The UE may measure downlink radio link quality by using the CSI-RS transmitted through the synchronization reference carrier from the base station. The UE maps hypothetical error rate of the e-PDCCH based on the measured downlink radio link quality to determine whether to synchronize the SCC based thereon.

(2) Method 2: The UE may map the hypothetical error rate of the e-PDCCH by using the common RS or the CSI-RS transmitted through the synchronization reference carrier from the base station. The UE may determine whether to synchronize the SCC based on the mapped hypothetical error rate.

(3) Method 3: The UE may map the hypothetical error rate of the e-PDCCH by using the DM-RS transmitted from the base station through the synchronization reference carrier. The UE may determine whether to synchronize the SCC based on the mapped hypothetical error rate.

As described above, when the SCC is the non-synchronized carrier, the UE may ensure synchronization of data transmitted through the SCC based on a signal (for example, a PSS/SSS, and the like) required for synchronization, which is transmitted through the non-synchronized carrier without using the aforementioned methods.

The base station may transmit the PSS/SSS which is the synchronized signal only in a specific subframe. For example, when the uplink and the downlink use the frequency division duplex (FDD) scheme as a duplexing scheme, the PSS/SSS may be transmitted with being included in subframe #0 which is the first subframe of the frame and subframe #5 which is the sixth subframe of the frame.

A reference signal used for demodulating the PDSCH data may be divided into a cell specific reference signal (CRS) or a UE specific reference signal (URS) according to a transmission mode (TM).

In the case of transmitting the PSS/SS and the URS by using the FDD scheme in the existing Rel' 10, a resource in which the URS is transmitted and a resource in which the PSS/SSS is transmitted may be duplicated. When both resources are duplicated, the URS is not transmitted in a resource element (RE) in which the PSS/SSS is transmitted. Further, the PDSCH data transmitted with being included in the RB in which the PSS/SSS is transmitted is discarded. However, although the PSS/SSS is transmitted, in the case where the PSS/SSS is transmitted by adjusting the position of the resource in which the UE specific RS (URS) is transmitted, the URS may be transmitted and the PDSCH data may also be transmitted even in the RB in which the PSS/SSS is transmitted.

Hereinafter, a URS pattern and a CSI-RS pattern disclosed in the embodiment of the present invention is one example for a pattern of allocating the resource so that the resource in which the PSS/SSS is transmitted and the resource in which the URS and the CSI-RS are transmitted are not duplicated with each other. The URS pattern and the CSI pattern that prevent duplication with the resource in which the PSS/SSS is transmitted according to the embodiment of the present invention may be implemented by various patterns and the embodiment is also included in the claims of the present invention.

Figure 11:
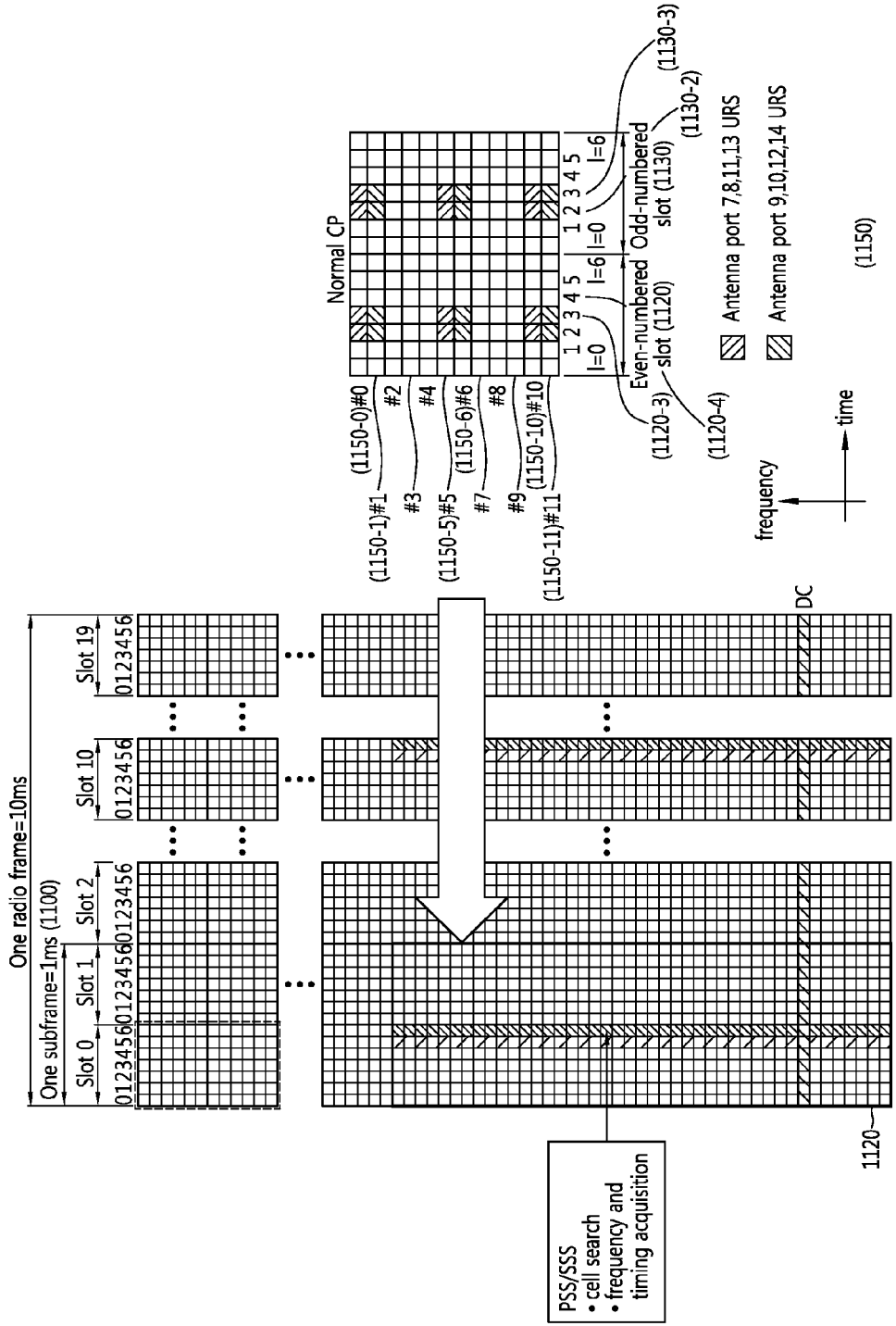
FIG. 11 is a conceptual diagram illustrating a method for transmitting a reference signal according to an embodiment of the present invention.

FIG. 11 is a conceptual diagram illustrating a method for transmitting a reference signal according to an embodiment of the present invention.

FIG. 11 illustrates a pattern of a URS of a subframe in which the PSS/SSS is transmitted in a system using the FDD as the duplexing scheme and using the normal CP as the CP.

The URS pattern disclosed in FIG. 11 may be used in a total frequency bandwidth of the subframe 1100 in which the PSS/SSS is transmitted or in an area 1120 of a frequency bandwidth (for example, center 6 RB) in which the PSS/SSS is transmitted or a frequency band including the center 6 RB. Referring to FIG. 11, a newly defined URS may be transmitted each of the slots 1120 and 1130 in corresponding resource elements at positions of third OFDM symbols 1120-3 and 1130-3 and fourth OFDM symbols 1120-4 and 1130-4 on a time axis and {subcarrier #0(1150-0), subcarrier #1(1150-1)}, {subcarrier #5(1150-5), subcarrier #6(1150-6)}, {subcarrier #10(1150-10), and subcarrier #11(1150-11)} among 12 subcarriers included in a resource block pair (RBP) on a frequency axis.

Antenna ports 7, 8, 11, and 13 may transmit the URS through {subcarrier #0(1150-0), subcarrier #5(1150-5), subcarrier #10(1150-10)} and antenna ports 9, 10, 12, and 14 may transmit the URS through {subcarrier #1(1150-1), subcarrier #6(1150-6), subcarrier #11(1150-11)}.

As another method, a new URS pattern may be defined and used only up to a resource block group (RBG) including a boundary surface of a frequency resource in which the PSS/SSS is transmitted by considering the size of PRB bundling. When the PRB bundling is used, the UE may assume that precoding granularity is a plurality of RBs. PRB bundled physical resource blocks (PRBs) may be precoded by using the same precoding vector. A set of the PRB bundled PRBs is referred to as a precoding resource block group (PRG). The size of the PRG may be determined according to the size of a system bandwidth.

Further, when the resource in which the URS is transmitted and the resource in which the CSI-RS is transmitted are duplicated with each other, which are defined in the method in which the CSI-RS is configured in the subframe in which the PSS/SSS is transmitted, the CSI-RS may be prevented from being transmitted in the duplicated resource areas. As another method, the subframe in which the CSI-RS is transmitted is configured not to be duplicated with the subframe in which the PSS/SSS is transmitted to prevent the resources in which the CSI-RS and the URS are transmitted from being duplicated with each other.

Similarly as the newly defined URS, a newly defined CSI-RS may also be limitatively used only in a predetermined region as the CSI-RS is transmitted only in the RB or subframe in which the PSS/SSS is transmitted. When a CSI-RS transmission pattern is configured, the CSI-RS transmission pattern may be configured with the resource in which the newly defined URS is transmitted.

As yet another method, when the resource in which the URS is transmitted and the resource in which the CSI-RS is transmitted are duplicated with each other by the newly defined URS pattern, it may be configured in such a manner that the CSI-RS is not transmitted and the URS is transmitted the duplicated resources.

Figure 12:
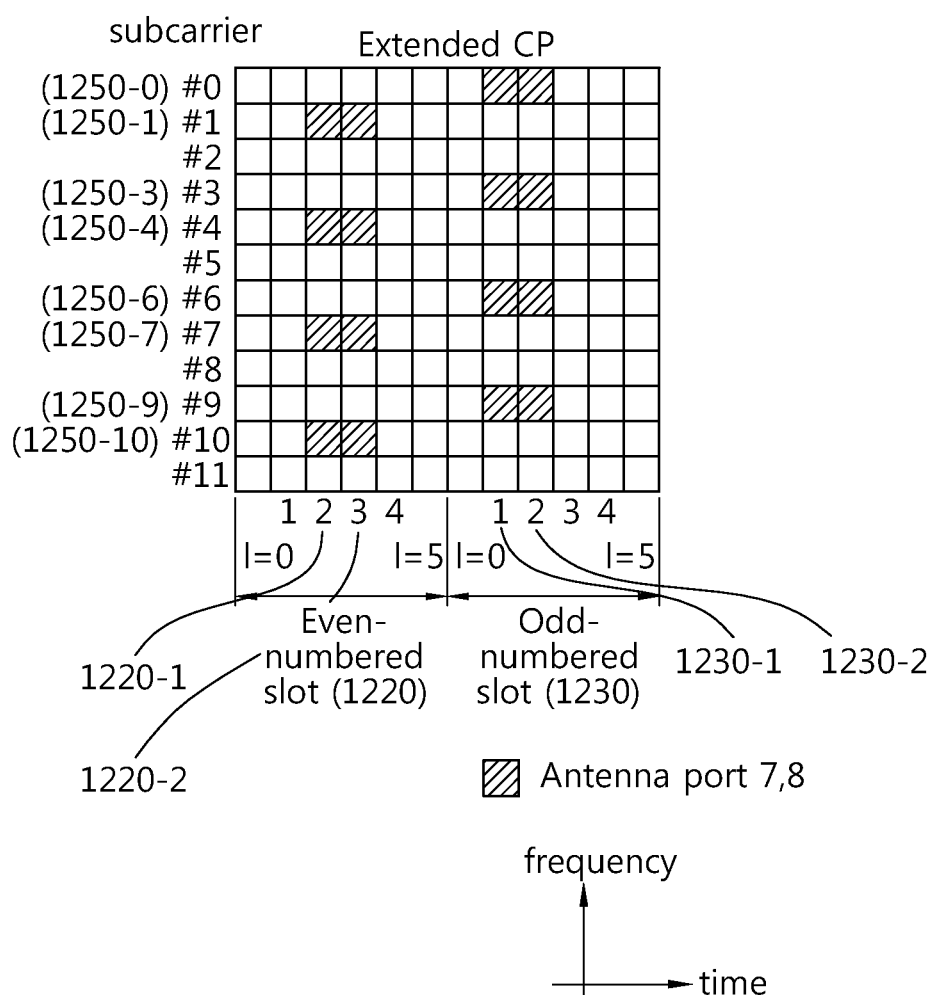
FIG. 12 is a conceptual diagram of a URS pattern in a subframe according to an embodiment of the present invention.

FIG. 12 is a conceptual diagram of a URS pattern in a subframe according to an embodiment of the present invention.

FIG. 12 illustrates an embodiment of a pattern of the URS of the subframe in which the PSS/SSS is transmitted in a system using the frequency division duplex as the duplexing method and the extended cyclic prefix as the CP.

Referring to FIG. 12, a newly defined URS may be transmitted to each of the slots 1220 and 1230 through resource elements corresponding to third OFDM symbols 1220-1 and 1230-1 and fourth OFDM symbols 1220-2 and 1230-2 on the time axis and subcarrier #1(1250-1), subcarrier #4(1250-4), subcarrier #7(1250-7), and subcarrier #10(1250-10) in an even-numbered slot 1220 on the frequency axis.

Further, the newly defined URS may be transmitted through the resource elements corresponding to the third OFDM symbol 1230-1 and the fourth OFDM symbol 1230-2 on the time axis and subcarrier #0(1250-0), subcarrier #3(1250-3), subcarrier #6(1250-6), subcarrier #9(1250-9) on the frequency axis, in an odd-numbered slot 1230.

Antenna port #7 and antenna port #8 may transmit the newly defined URS.

Similarly as the case using the normal CP, the URS pattern disclosed in FIG. 12 may be an effective pattern only in a subframe region in which the PSS/SSS is transmitted. That is, in a subframe region in which the PSS/SSS is not transmitted, the base station may transmit the URS to the UE by using a URS pattern other than the URS pattern disclosed in FIG. 12.

As another method, the URS pattern disclosed in FIG. 12 may be effectively transmitted only in a frequency resource (for example, 6 RB) in which the PSS/SSS is limitatively transmitted. As yet another method, the URS may be transmitted by using the URS pattern disclosed in FIG. 12 up to the RBG including the boundary surface of the frequency resource in which the PSS/SSS is transmitted by considering the size of the PRB bundling.

Further, similarly as the case using the normal CP, when the CSI-RS is configured in the subframe in which the PSS/SSS is transmitted, the resource in which the URS is transmitted and the resource in which the CSI-RS is transmitted, which are defined in FIG. 12 may be duplicated with each other. It may be configured in such a manner that the CSI-RS is not transmitted and the URS is transmitted in the duplicated resources.

As still another method, the subframe in which the CSI-RS is transmitted may be configured not to be duplicated with the subframe in which the PSS/SSS is transmitted. For example, the CSI-RS may not be transmitted in the subframe in which the PSS/SSS is transmitted. In this case, a collision on the transmission resources of the CSI-RS and the URS may be prevented.

When a new carrier type (NCT) subframe is used in the S-cell and a frequency of the S-cell is activated, the base station may signal the position of an OFDM symbol allocated through the PDSCH to the UE through higher layer signaling. The NCT subframe maintains the existing frame structure (for example, the CP length, the subframe structure, and the duplex mode), but may be changed in a method in which an actually transmitted reference signal and/or control channel (PDCCH) data is transmitted.

A parameter indicating the position of the OFDM symbol in which the PDSCH is started in the NCT subframe may be defined as a term called a data start parameter (1DataStart parameter). The data start parameter may have values of 1 to 4.

In the subframe including the newly defined URS in FIGS. 11 and 12, the OFDM symbol corresponding to the value set as the data start parameter (1DataStart parameter) may be temporally later than the OFDM symbol in which the URS is transmitted. For example, when it is assumed that the value of the data start parameter is 4, the PDSCH data may be included from the fifth OFDM symbol of the subframe. In this case, the URS transmitted in the OFDM symbol (fourth OFDM symbol) corresponding to 1=3 is temporally earlier than the OFDM symbol in which the PDSCH data is actually transmitted. When the OFDM symbol to transmit the URS is temporally earlier than the OFDM symbol to start transmitting the PDSCH data, the UE may perform various following operations in demodulating the PDSCH data as the operation of the UE.

(1) Method 1: The UE assumes that the PDSCH data is not transmitted.

In the case of Method 1, the PDSCH data transmitter later than the transmitted URS may be discarded.

(2)-1 Method 2-1: The UE demodulates the PDSCH data by using even the URS of the OFDAM symbol transmitted earlier than the OFDM symbol corresponding to the data start parameter value together. In Method 2-1, the PDSCH data may be demodulated based on the URS before the PDSCH data is transmitted.

(2)-2 Method 2-2: The UE demodulates the PDSCH data by using the URS of the OFDM symbol transmitted simultaneously with or later than the OFDM symbol corresponding to the data start parameter value. That is, in the case of Method 2-2, the URS that is transmitted earlier than the OFDM symbol corresponding to the data start parameter value is not used to demodulate the PDSCH data. In Method 2-2, only the URS transmitted through the OFDM symbol corresponding to the data start parameter value or the OFDM symbol larger than the data start parameter value is used to demodulate the PDSCH data. In this case, the corresponding UE assumes that the base station performs PDSCH transmission through a single antenna port.

(2)-3 Method 2-3: Among symbols that transmit the URS, the OFDM symbol corresponding to the data start parameter value and the OFDM symbol that transmits the URS before the data start parameter value may be symbols that perform code division multiplexing (CDM). In this case, the UE does not use the URS included in the OFDM symbol that performs the CDM for demodulating the PDSCH data. The UE demodulates the PDSCH data by using the URS transmitted in another slot.

For example, when the PDSCH data is transmitted with the data start parameter value being set as 2 in FIG. 11, a second OFDM symbol ( ) included in the even-numbered slot( ) is transmitted earlier than the PDSCH data. A third OFDM symbol ( ) included in the even-numbered slot( ) is transmitted in an OFDM symbol which is at the same data start position as the PDSCH data. The third OFDM symbol ( ) is an OFMD symbol that performs the CDM with the second OFDM symbol.

In this case, the UE does not use the URS( ) of the even-numbered slot( ) for demodulating the PDSCH data. The UE may demodulate the PDSCH data by using only the URS received through the odd-numbered slot.

In Method 3-2, a resource designated in such a manner that the URS is transmitted the even-numbered slot may be used for transmitting not the URS but the PDSCH data or in the corresponding resource region, the URS is not transmitted and puncturing may be achieved.

(3) Method 3: The 1DataStart value set in the higher layer may be limited to a value smaller than 4 by considering the position of the URS. For example, in the case of the general CP illustrated in FIG. 11, the 1DataStart value may be set to 2 and in the case of the extended CP illustrated in FIG. 12, the 1DataStart value may be set to 1. By using such a method, the PDSCH data may be demodulated based on the URS.

The aforementioned PDSCH data demodulating method may be limitatively applied to the region where the newly defined URS is transmitted. For example, since the UE specific RS (URS) may be defined only in the frequency band (for example, 6 RB based on the center frequency) in which the PSS/SSS is transmitted.

Further, the aforementioned methods may be applied to even the downlink control channel included in the PDSCH data demodulated by using the URS. For example, the aforementioned methods may be applied to even the data transmitted through the control channel defined in the region other than the region where the legacy PDCCH is defined, such as the e-PDCCH. Similarly as the method of demodulating the PDSCH data, whether to demodulate the e-PDCCH data may be determined based on the position of the URS and the position of the OFDM symbol that transmits the e-PDCCH data.

In the case where the effective URS is defined only in the frequency resource in which the PSS/SSS is transmitted, when the frequency resource allocated through the downlink control channel includes a boundary of the frequency resource in which the PSS/SSS is transmitted, the UE does not assume that the same precoding method is applied to the PDSCH data included in the RBG including the boundary in respect to the URS used for demodulating the PDSCH data.

Figure 13:
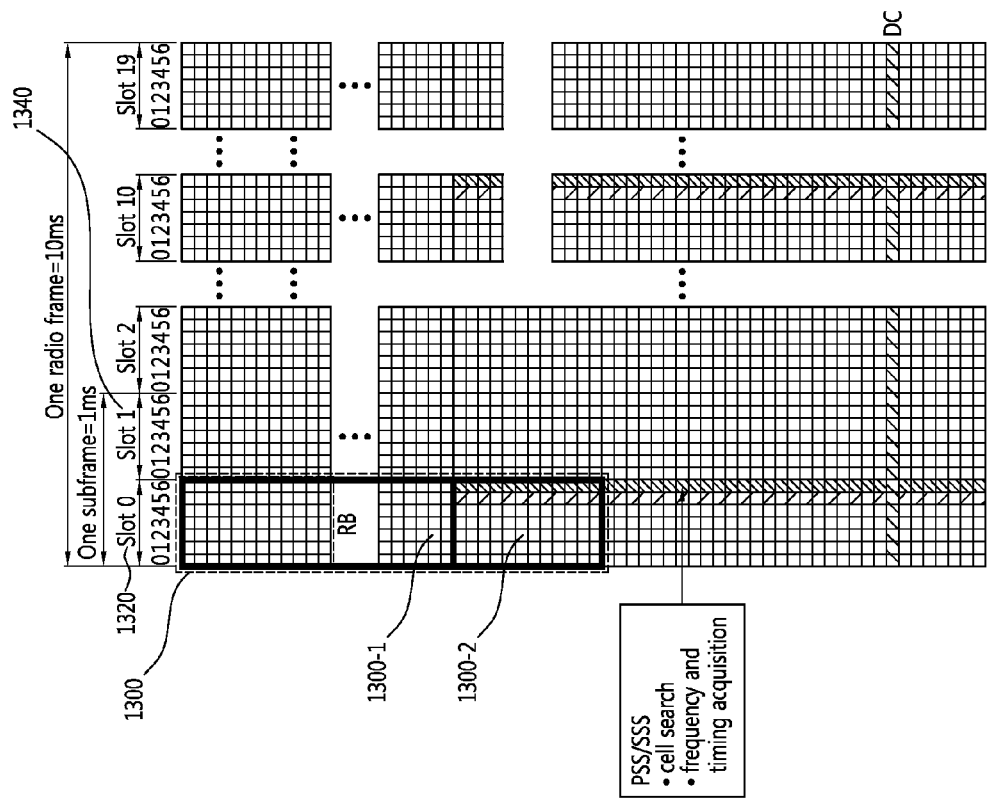
FIG. 13 is a conceptual diagram illustrating a method for precoding PDSCH data included in an RBG according to an embodiment of the present invention.

FIG. 13 is a conceptual diagram illustrating a method for precoding PDSCH data included in an RBG according to an embodiment of the present invention.

The base station may not apply, in the RBG 1300 defined to include the boundary of the frequency resource in which the PSS/SSS is transmitted, the same precoding to the PDSCH data included in an RB 1300-2 which is the same as the PSS/SSS and the PDSCH data included in an RB 1300-1 which is not the same as the PSS/SSS. For example, it may be assumed that the RBG 1300 corresponding to 3 RBs is allocated, which includes the boundary of the frequency resource in which the PSS/SSS is transmitted and in the RBG 1300, 1 RB 1300-2 includes the frequency resource in which the PSS/SSS is transmitted. In this case, the UE does not estimate that 2 RB 1300-1 in which the PSS/RSSS is transmitted and 1 RB 1300-2 in which the PSS/SSS is transmitted among the 3 RBs have the same precoding. Accordingly, when the UE performs channel estimation by using the URS, the UE may not perform the channel estimation through a channel estimating method (for example, interpolation using the URS) using both a URS corresponding to the 2 RB 1300-1 and a URS corresponding to the 1 RB 1300-2.

As another method, it is assumed that the same precoding is applied to the RBG 1300 including the RB 1300-2 in which the PSS/SSS is transmitted and the RB 1300-1 in which the PSS/SSS is not transmitted, and only PDSCH data transmission of rank 1 may be permitted. As described above, the newly defined URS pattern may be applied to only the RB 1300-2 in which the PSS/SSS is transmitted. In this case, the URSs transmitted through the RBs included in the RBG may be different from each other. That is, since the URS patterns of the RBs in the RBG 1300 including the boundary may be different from each other, the URS multiplexed by using the CDM may not be applied to permit only transmission of rank 1.

As yet another method, using the PRB bundling may be limited in the subframe in which the PSS/SSS is transmitted or the frequency band in which the PSS/SSS is transmitted. In this case, the UE may perform the demodulation without distinguishing the boundary of the frequency band in which the PSS/SSS is transmitted or not.

As still another URS transmitting method, the base station may not transmit a URS defined in a slot which is duplicated with the position of the PSS/SSS in the frequency resource in which the PSS/SSS is transmitted. That is, the base station may transmit the URS only in one slot (for example, the even-numbered slot 1340) in which the PSS/SSS is not transmitted. The UE may demodulate the PDSCH data based on the transmitted URS.

Figure 14:
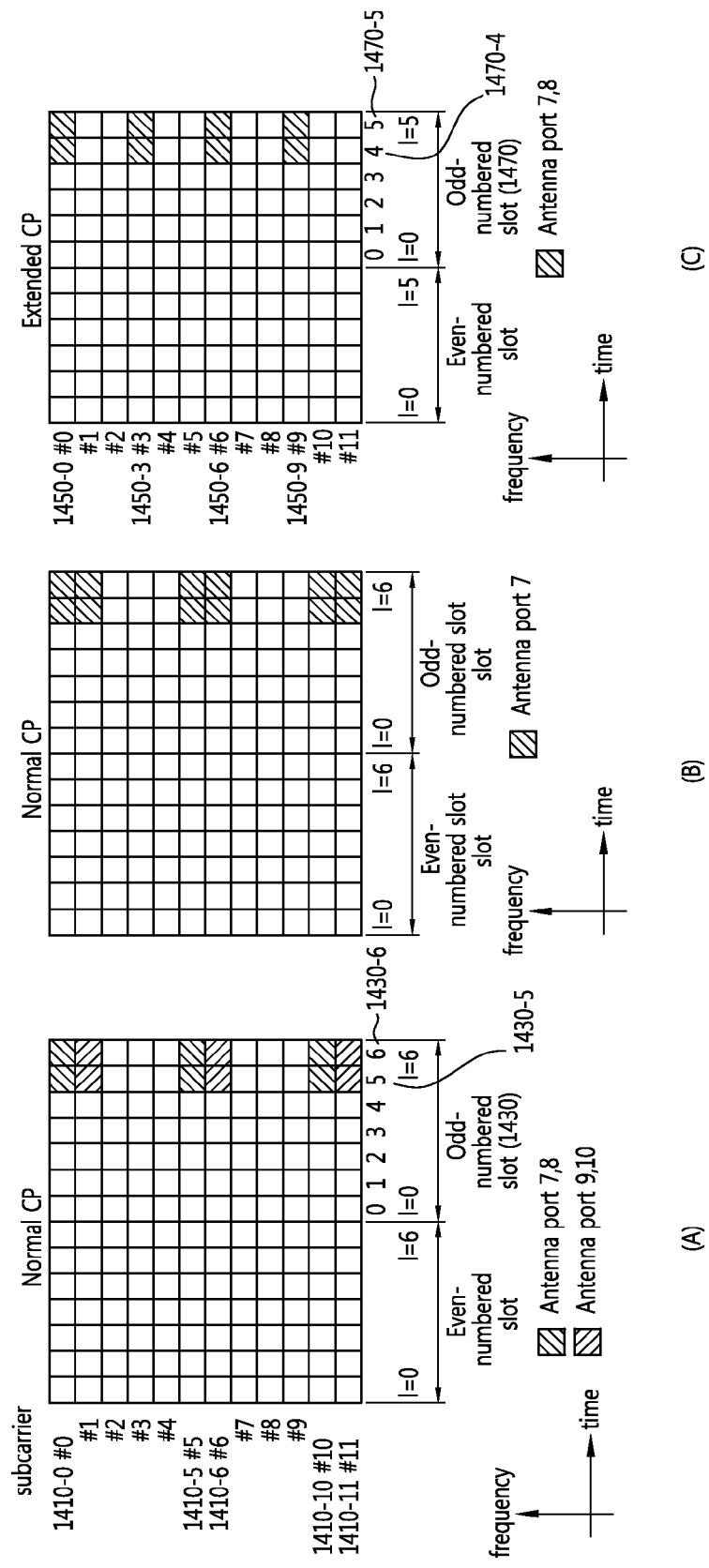
Figure 16:
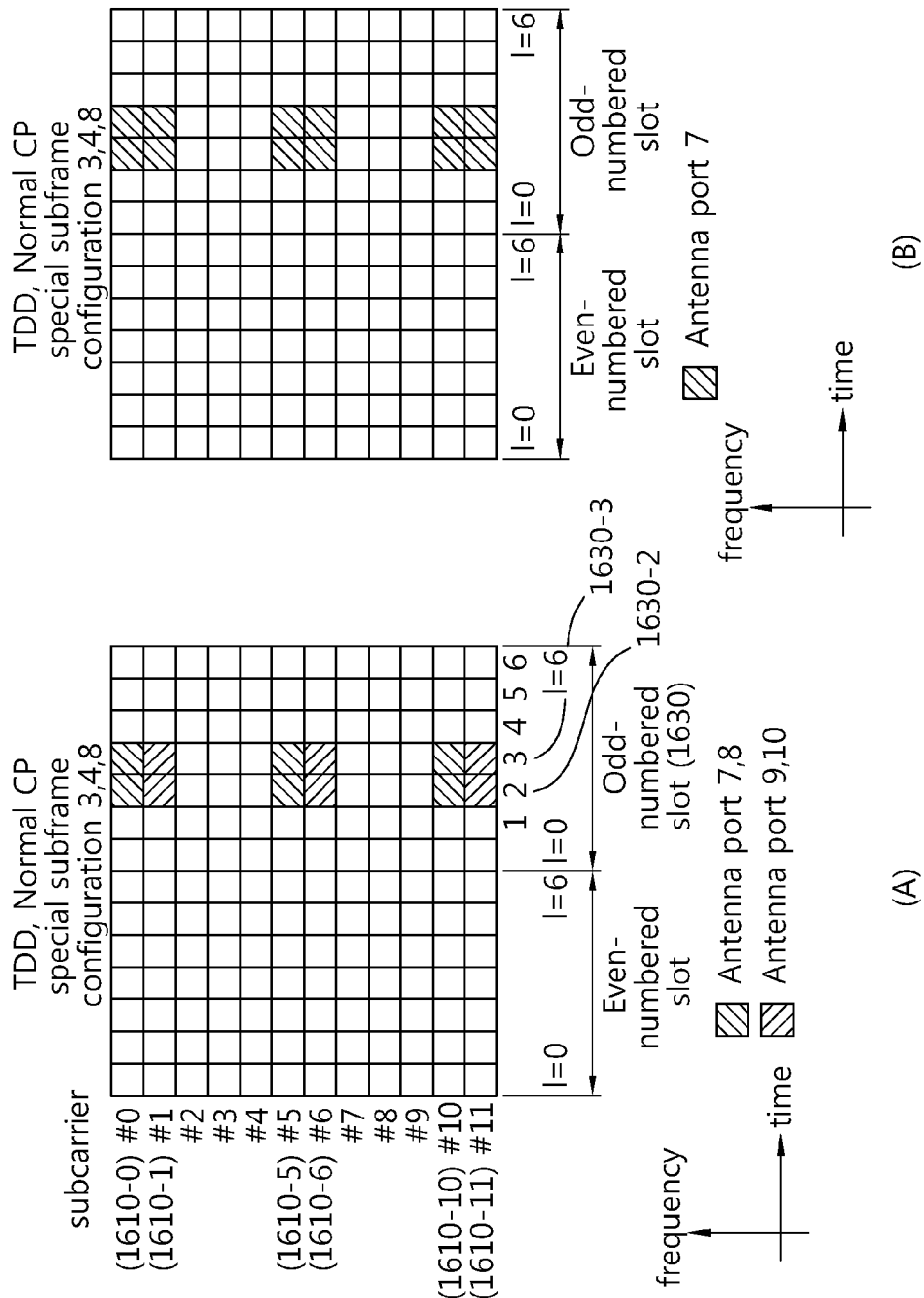
FIGS. 16 to 17 illustrate the URS pattern according to the embodiment of the present invention.

FIGS. 14 to 16 are conceptual diagrams illustrating a URS pattern according to an embodiment of the present invention.

FIG. 14(A) illustrates a URS transmitted by using the normal CP and through four antenna ports of #7, #8, #9, and #10.

Referring to FIG. 14(A), the URS may be defined in resource elements of a sixth OFDM symbol 1430-5 and a seventh OFDM symbol 1430-6 in the odd-numbered slot 1430 on the time axis, and resource elements of {subcarrier #0(1410-0), subcarrier #1(1410-1)}, {subcarrier #5(1410-5), subcarrier #6(1410-6)}, and {subcarrier #10(1410-10), subcarrier #11(1410-11)} on the frequency axis. Antennas #7 and #8 may transmit to the UE a URS defined in {subcarrier #0(1410-0), subcarrier #5(1410-5), subcarrier #10(1410-10)} and antennas #9 and #10 may transmit to the UE a URS defined in {subcarrier #1(1410-1), subcarrier #6(1410-6), subcarrier #11(1410-11)}.

In the case of FIG. 14(A), antennas #7 and #8 are multiplexed by using the code division multiplexing method and antennas #9 and #10 are also multiplexed by using the code division multiplexing method. (Antenna #7, antenna #8) and (antenna #9, antenna #10) are multiplexed by the frequency division multiplexing (FDM) using different frequency bands. That is, the base station may perform up to transmission of rank 4 by using four antenna ports.

FIG. 14(B) defines a URS transmitted through a single antenna port such as antenna port #7 in the normal CP. The position of the URS defined in FIG. 14(B) is the same as that in FIG. 14(A). Antenna #7 may be defined in subcarriers {subcarrier #0, subcarrier #1}, {subcarrier #5, subcarrier #6}, {subcarrier #10, subcarrier #11}.

FIG. 14(B) illustrates a transmission method of the URS when transmission corresponding to rank 1 is performed by using one antenna port. Similarly as FIG. 12(A), the URS is not transmitted in the even-numbered slot and the URS transmitted in the odd-numbered slot is used to demodulate the PDSCH data.

In the embodiment of the present invention, the base station does not transmit the URS in the even-numbered slot to prevent a collision with the resource in which the PSS/SSS is transmitted. In order to demodulate the PDSCH data transmitted in the RB of the even-numbered slot in which the URS is not transmitted, the PDSCH data may be demodulated by using the URS transmitted in the odd-numbered slot.

FIG. 14(C) illustrates the URS pattern when the extended CP is used in the subframe.

Referring to FIG. 14(C), the URS may be defined in resource elements of a fifth OFDM symbol 1470-4 and the sixth OFDM symbol 1470-5 in the odd-numbered slot 1470 on the time axis, and resource elements of {subcarrier #0(1450-0), subcarrier #3(1450-3)}, {subcarrier #5(1450-5), subcarrier #6(1450-6), subcarrier #5(1450-9)} on the frequency axis. Antennas #7 and #8 may transmit to the UE a URS defined in {subcarrier #0(1450-0), subcarrier #3(1450-3), subcarrier #6(1450-6), subcarrier #9(1450-9)}. Antennas #7 and #8 are multiplexed by using the CDM method. Similarly as the case in which the subframe uses the extended CP, the URS is not transmitted in the even-numbered slot and the URS transmitted in the odd-numbered slot is used to demodulate the PDSCH data.

When the URS patterns illustrated in FIGS. 14(A) to 14(C) are used, since a weight occupied by the URS in the RB decreases, demodulation capability deterioration of PDSCH information may occur. Accordingly, in order to improve the demodulation capability of the PDSCH data, the URS may be transmitted by increasing transmission power at the time of transmitting the URS.

For example, the UE may set a ratio of an energy per resource element (PDSCH EPRE) and a URS EPRE to −3 dB in respect to the OFDM symbol in which the URS is transmitted in the case where the number of layers transmitted thereto is 2 or less and set the ratio to −6 dB in the case where the number of layers transmitted thereto is more than 2. Herein, the EPRE represents energy per resource element.

Hereinafter, in the embodiment of the present invention, a method for transmitting the URS when the duplexing is performed by the TDD scheme will be disclosed.

FIG. 15 illustrates the URS pattern defined in the TDD scheme according to an embodiment of the present invention.

FIG. 15 discloses the URS pattern in a part where the position of the resource in which the PSS/SSS is transmitted and the position of the resource in which the URS is transmitted are duplicated with each other, in respect to the TDD-scheme normal subframe using the time division duplex (TDD0 as the duplexing scheme and using the normal CP as the CP.

FIG. 15(A) discloses the URS transmitting method using four antenna ports. The URS may be defined in resource elements of a sixth OFDM symbol 1520-6 and a seventh OFDM symbol 1520-7 in an even-numbered slot 1520 on the time axis, and resource elements of {subcarrier #0(1510-0), subcarrier #1(1510-1), subcarrier #5(1510-5), subcarrier #6(1510-6), subcarrier #10(1510-10), subcarrier #11(1510-11)} on the frequency axis.

Antennas ports #7 and #8 are multiplexed by using the CDM and antennas ports #9 and #10 are also multiplexed by the CDM. (Antenna #7, antenna #8) and (antenna #9, antenna #10) are multiplexed by the FDM using different frequency bands. That is, the UE may perform up to transmission of rank 4 by using four antenna ports.

The base station may transmit the URS in resource elements of the sixth and seventh OFDM symbols on the time axis in the even-numbered slot and in resource elements of {subcarrier #0, subcarrier #1, subcarrier #5, subcarrier #6, subcarrier #10, subcarrier #11} on the frequency axis.

FIG. 15(B) illustrates a transmission method of the URS when transmission corresponding to rank 1 is performed by using one antenna port in the TDD-scheme normal subframe. Similarly as FIG. 15(A), the base station may transmit the URS in the even-numbered slot and not transmit the URS in the odd-numbered slot. The UE may demodulate the PDSCH data based on the received URS.

Figure 17:
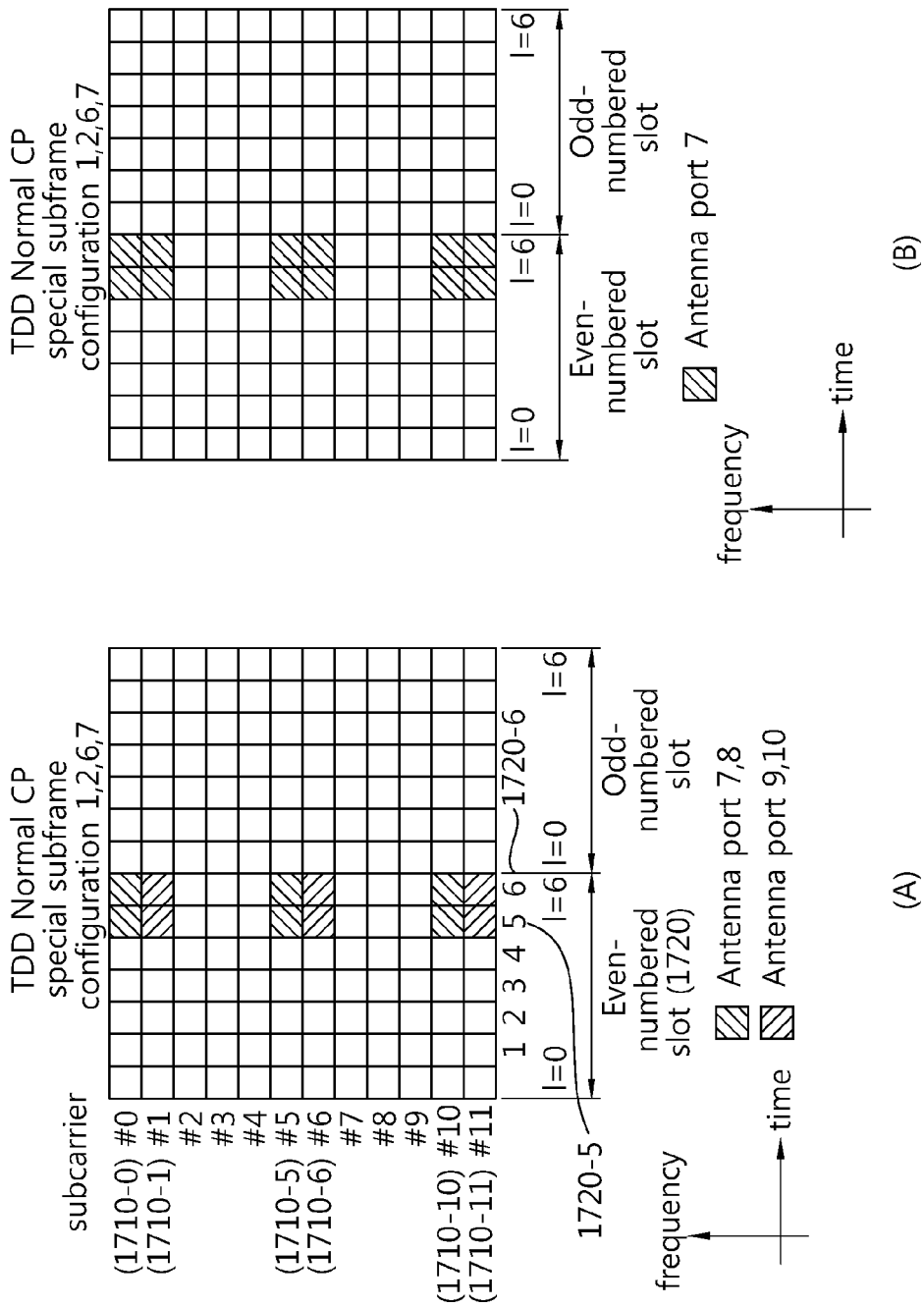

FIGS. 16 to 17 illustrate the URS pattern according to the embodiment of the present invention.

FIGS. 16 and 17 disclose a URS pattern when the URS in the part where the positions of the PSS/SSS and the URS are duplicated with each other is not transmitted, in respect to a special subframe using the TDD as the duplexing scheme and using the normal CP as the CP. The URS defined in the special subframe may be used by defining a URS different from the URS in the aforementioned TDD-scheme normal subframe in FIG. 15.

Figure 18:
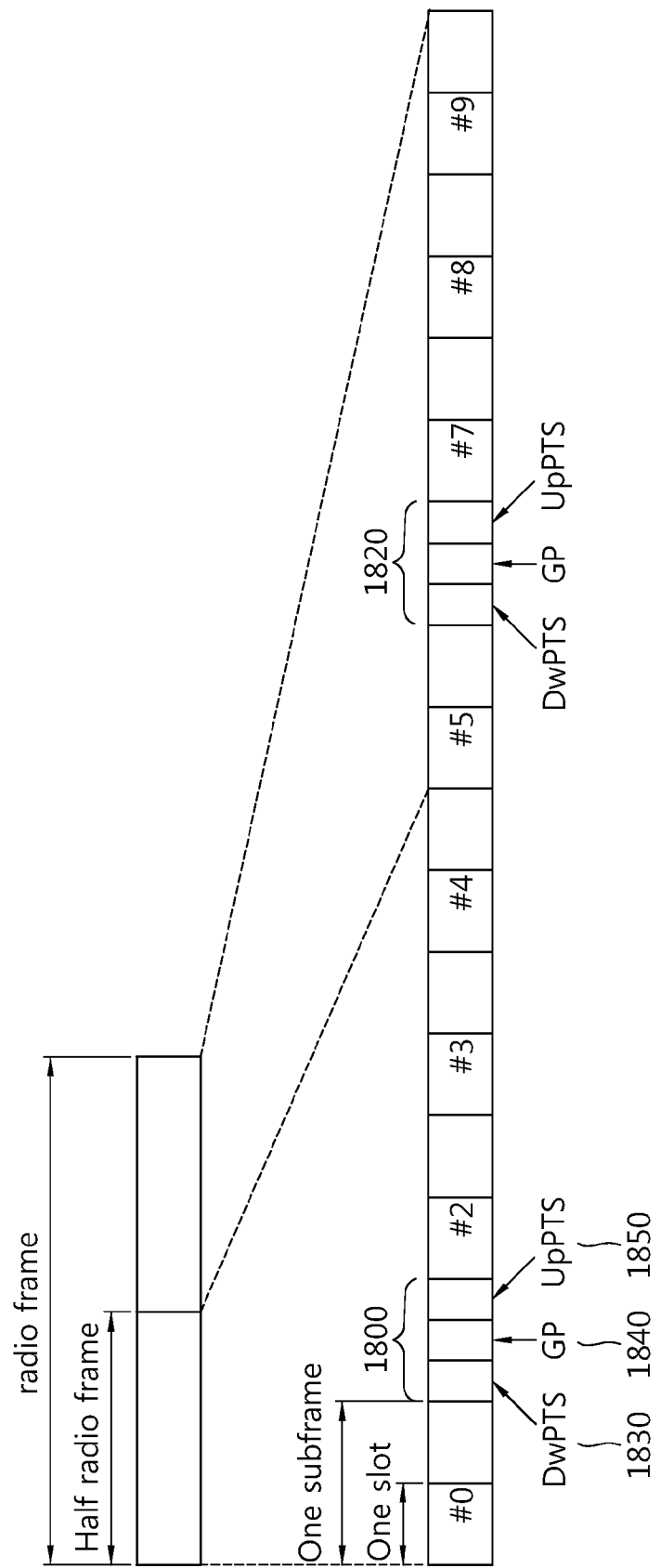
FIG. 18 is a conceptual diagram illustrating a special subframe in a TDD scheme.

FIG. 18 is a conceptual diagram illustrating a special subframe in a TDD scheme.

Referring to FIG. 18, in a TDD-scheme radio frame structure, the special subframe represents subframes corresponding to index #1 1800 and index #6 1820. The special subframe includes a downlink pilot time slot (DwPTS), 1830, a guard period (GP) 1840, and a uplink pilot time slot (UpPTS) 1850. The DwPTS 1830 is used in initial cell search, synchronization, or channel estimation in the user equipment. The UpPTS 1850 is used to match channel estimation in the base station and uplink transmission synchronization of the user equipment. The GP 1840 is a period for removing an interference which occurs in the uplink due to a multipath delay of the downlink signal between the uplink and the downlink.

Configurations (the lengths of the DwPTS 1830, the GP 1840, and the UpPTS 1850) of the special frames 1800 and 1820 may be different from each other according to a set-up of the special frame.

According to the embodiment of the present invention, the URS may be defined differently from each other according to the special subframe configuration. The number of symbols corresponding to the DwPTS 1830, the GP 1840, and the UpPTS 1850 may vary depending on the configuration of the special subframe. The configuration of the special frame is defined in 4.2 frame structure type 2 of 3GPP TS 36.211 v.10.4.0 "3rd Generation Partnership Project; Technical Specification Group Radio Access Network; Evolved Universal Terrestrial Radio Access (E-UTRA); Physical Channels and Modulation (Release 10) opened in December 2011.

Referring back to FIG. 16(A), in the case where the special subframe configuration is 3, 4, and 8, the URS may be defined in a third OFDM symbol 1630-2 and a fourth OFDM symbol 1630-3 on the time axis in an odd-numbered slot 1630 and {subframe #0(1610-0), subframe #1(1610-1), subframe #5(1610-5), subframe #6(1610-6), subframe #10(1610-10), subframe #11(1610-11)} on the frequency axis.

FIG. 16(A) illustrates a URS transmitting method using four antenna ports in the special subframe. Antennas #7 and #8 may transmit a URS through {subframe #0(1610-0), subframe #5(1610-5), subframe #10(1610-10)} and antennas #9 and #10 may transmit the URS through {subframe #1(1610-1), subframe #6(1610-6), subframe #11(1610-11)}.

Antennas ports #7 and #8 are multiplexed by using the CDM and antennas ports #9 and #10 are also multiplexed by the CDM. (Antenna #7, antenna #8) and (antenna #9, antenna #10) are multiplexed by the FDM using different frequency bands. That is, the UE may perform up to transmission of rank 4 by using four antenna ports.

FIG. 16(B) illustrates a transmission method of the URS when transmission corresponding to rank 1 is performed by using one antenna port in the TDD-scheme normal subframe when the special frame configuration is 3, 4, and 8. The URS may be defined in the same resource element as in FIG. 16(A). Antenna #7 may transmit the defined URS to the UE.

FIG. 17 is a conceptual diagram illustrating the URS included in the subframe when the special frame configuration is 1, 2, 6, and 7.

Referring back to FIG. 17(A), in the case where the special subframe configuration is 1, 2, 6, and 7, the URS may be defined in a sixth OFDM symbol 1720-5 and a seventh OFDM symbol 1720-6 on the time axis in an even-numbered slot 1720 and {subframe #0(1710-0), subframe #1(1710-1), subframe #5(1710-5), subframe #6(1710-6), subframe #10 (1710-10), subframe #11(1710-11)} on the frequency axis.

FIG. 17(A) illustrates a URS transmitting method using four antenna ports in the special subframe. Antennas #7 and #8 may transmit a URS through {subframe #0(1710-0), subframe #5(1710-5), subframe #10(1710-10)} and antennas #9 and #10 may transmit the URS through {subframe #1(1710-1), subframe #6(1710-6), subframe #11(1710-11)}.

Antennas ports #7 and #8 are multiplexed by using the CDM and antennas ports #9 and #10 are also multiplexed by the CDM. (Antenna #7, antenna #8) and (antenna #9, antenna #10) are multiplexed by the FDM using different frequency bands. That is, the UE may perform up to transmission of rank 4 by using four antenna ports.

FIG. 17(B) illustrates a transmission method of the URS when transmission corresponding to rank 1 is performed by using one antenna port in the TDD-scheme normal subframe when the special frame configuration is 1, 2, 6, and 7. The URS may be defined in the same resource element as in FIG. 17(A). Antenna #7 may transmit the defined URS to the UE.

In the case where the system bandwidth is constituted by odd RBs, an RB may exist, in which the PSS/SSS transmitted at the same position as the position at which the PSS/SSS is transmitted is not transmitted in all frequency bands of one RB.

Figure 19:
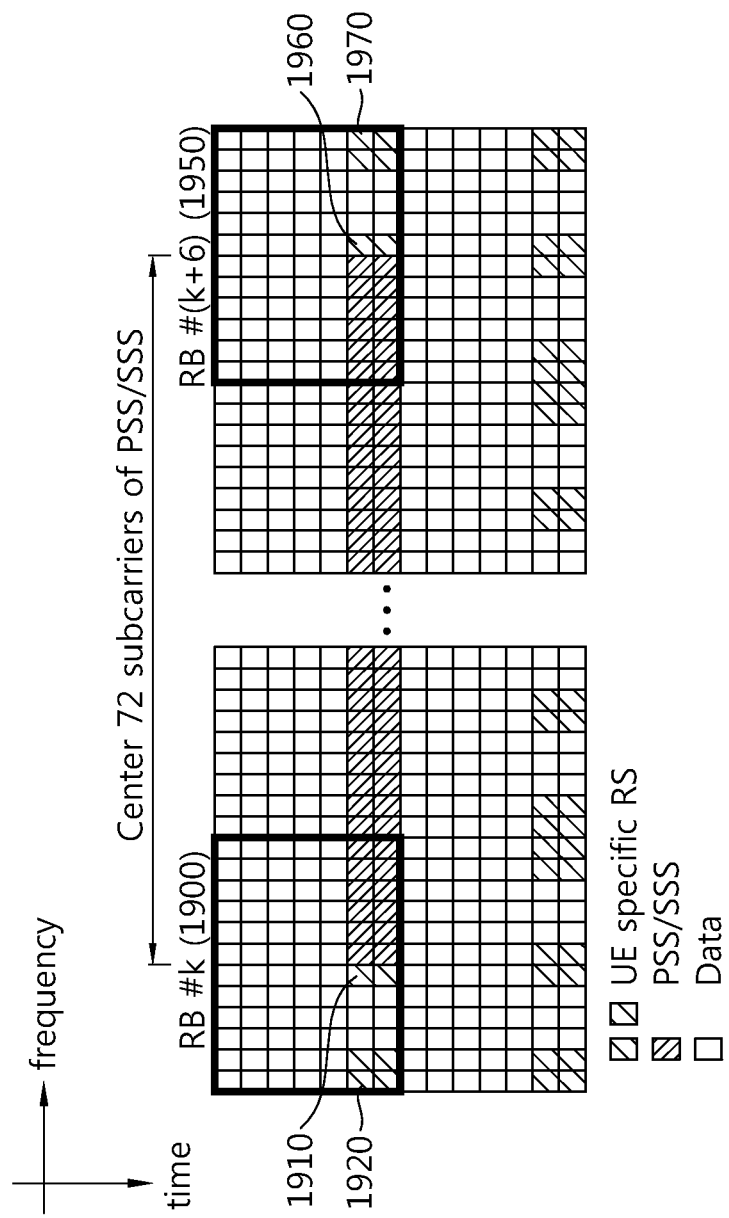
FIG. 19 is a conceptual diagram illustrating a method for transmitting a URS according to an embodiment of the present invention.

FIG. 19 is a schematic diagram illustrating a method of transmitting a URS according to the exemplary embodiment of the present invention.

Referring to FIG. 19(A), when the position of the resource element to which the URS is transmitted collides with the position of the resource transmitted by the PSS/SSS, the base station does not transmit the URS of the collided position to the user equipment. The RB including the PSS/SSS may be present in only some frequency bandwidths of the RB among the RBs in which the PSS/SSS is included based on the central frequency. In this case, the remaining resource area in which the PSS/SSS of the RB is not transmitted may include URSs 1910, 1920, 1960, and 1970. The UE may enhance demodulation performance of the PDSCH data based on the URSs 1910, 1920, 1960, and 1970 transmitted in the corresponding area.

Like a RB #k 1900 of FIG. 19, in the case of the RB to which only a part of the URSs 1910 and 1920 is transmitted, the number of URSs transmitted from the URS antenna port x may be larger than the number of URSs transmitted from the URS antenna port y. Accordingly, the PDSCH data transmitted from the RB #k 1900 may perform PDSCH demodulation of the rank 1 based on the URS antenna port x. On the other hand, in the case of an RB #k+6 1950, the number of URSs 1960 and 1970 transmitted from the URS antenna port y may be larger than the number of URSs transmitted from the URS antenna port x. Accordingly, the PDSCH data transmitted from the RB #k 1950 may perform PDSCH demodulation of the rank 1 based on the URS antenna port y.

According to an implementing method of the UE, the URSs 1910, 1920, 1960, and 1970 included and transmitted in the RB #k 1900 or the RB #k+6 1950 of FIG. 19 may not be used during the demodulation of the PDSCH data.

Figure 20:
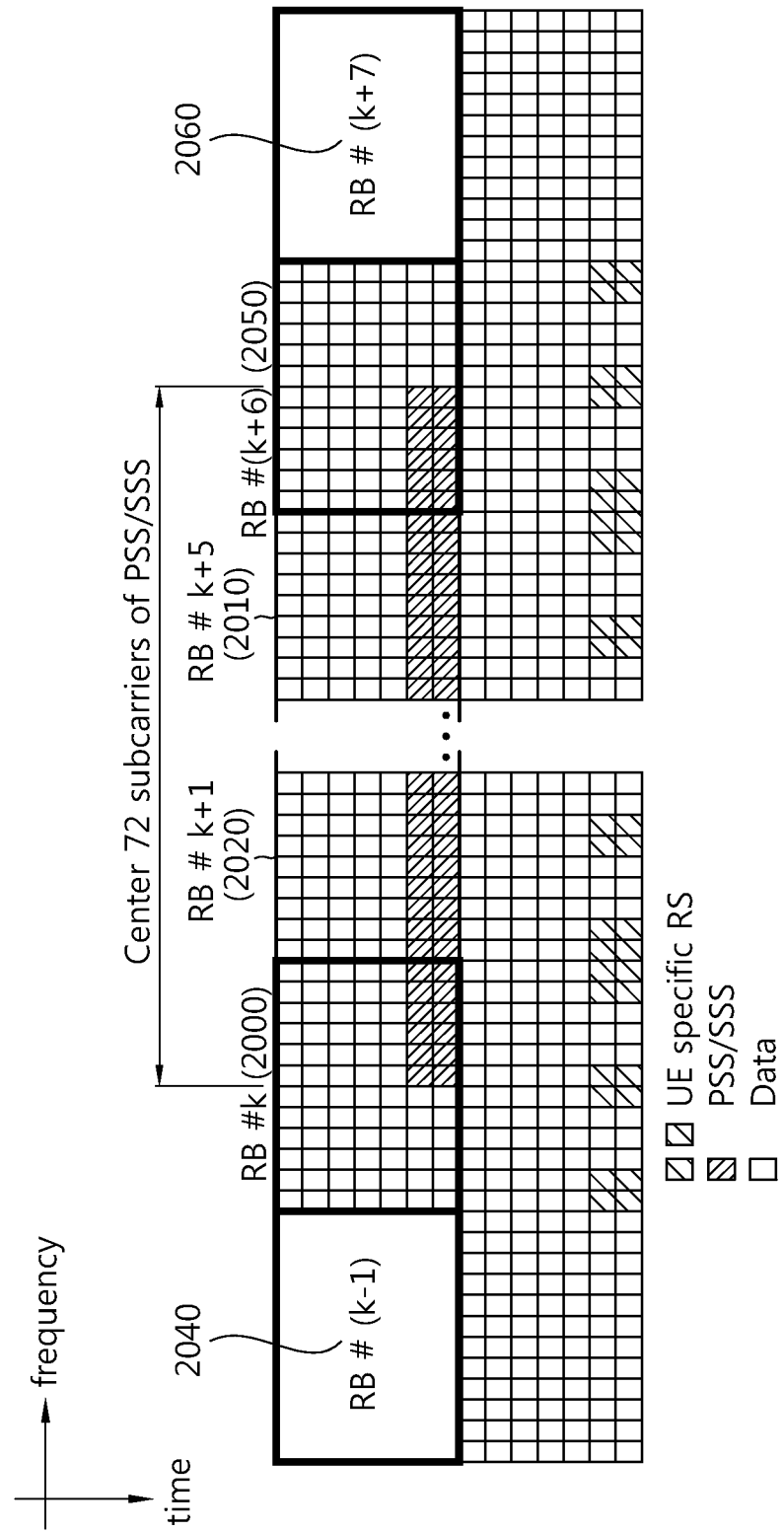
FIG. 20 is a conceptual diagram illustrating a method for transmitting a URS according to an embodiment of the present invention.

FIG. 20 is a schematic diagram illustrating a method of transmitting a URS according to the exemplary embodiment of the present invention.

FIG. 20 is a schematic diagram illustrating a method in which the URSs are not included even in the RB where the PSS/SSS is not transmitted in the entire frequency bandwidth.

Referring to FIG. 20, RBs 2000 and 2050 in which the PSS/SSS does not fill all the frequency bands corresponding to one RB may not include the URS. This is to reduce complexity of the channel estimation. In this case, the PDSCH data may be included and transmitted in the resource which does not transmit the URS. The RBs may be divided into the RBs 2010 and 2020 including the PSS/SSS in all the frequency bandwidths, the RBs 2000 and 2050 including the PSS/SSS in some frequency bandwidths, and the RBs 2040 and 2060 without the PSS/SSS.

Like FIG. 20, in the case where some or all of the URSs are not transmitted due to collision with the PSS/SSS, the UE may assume some or all of the following items during the demodulation of the PDSCH data.

(1) The UE may assume the PDSCH data included in the RBs 2000 and 2050 including the PSS/SSS in some frequency bandwidths or the RBs 2010 and 2020 including the PSS/SSS in all the frequency bandwidths as data transmitted to the rank 1.

(2) When the UE receives the PDSCH data included in the RBs 2000 and 2050 including the PSS/SSS in some frequency bandwidths or the RBs 2010 and 2020 including the PSS/SSS in all the frequency bandwidths and the RBs 2040 and 2060 without the PSS/SSS to one RBG, the UE may assume the PDSCH data included in the corresponding RBG as the data transmitted to the rank 1.

(3) The UE may assume that the PDSCH data included in the RBs 2000 and 2050 including the PSS/SSS in some frequency bandwidths or the RBs 2010 and 2020 including the PSS/SSS in all the frequency bandwidths and the RBs 2040 and 2060 without the PSS/SSS to one RBG is not one RBG.

The UE may perform the demodulation for the PDSCH data received based on at least one assumption among the assumptions (1) to (3).

In the case where the URS is not transmitted in the PSS/SSS area but URS-punctured, the UE may assume that the PDSCH data is transmitted in the area where the URS is punctured. The UE may perform the demodulation by assuming the RB area where the URS is punctured as the data in which the base station is transmitted to as the rank 1. Further, the UE may assume that the RB where the URS is punctured and the RB where the URS is transmitted are not scheduled together.

Figure 21:
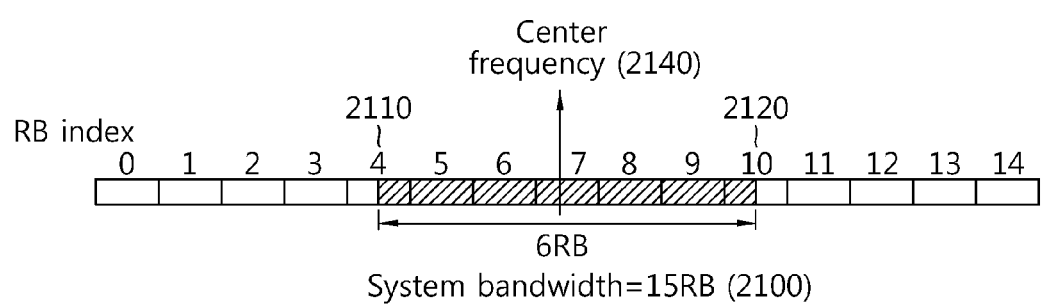
FIG. 21 is a conceptual diagram illustrating a method for transmitting a URS according to an embodiment of the present invention.

FIG. 21 is a schematic diagram illustrating a method of transmitting a URS according to the exemplary embodiment of the present invention.

Referring to FIG. 21, as a method of solving the collision problem of the PSS/SSS and the URS, in the subframe transmitting the PSS/SSS, the position of the OFDM symbol in which URS is transmitted may be changed.

As described above, since the PSS/SSS is transmitted only in some of all the frequency bands 2100 (for example, the frequency band 2150 against the center 6 RB), the OFDM symbol, which transmits the URS only in some of the frequency bands such as the frequency bands in which the PSS/SSS is transmitted, may be changed.

Referring to FIG. 21, for example, the entire system bandwidth 2100 is assumed as a frequency bandwidth including 15 RBs including RBs having indexes of 0 to 14, and the frequency band in which the PSS/SSS is transmitted is assumed as the frequency band 2150 corresponding to 6 RBs.

The PSS/SSS may be transmitted in the entire bandwidth in RB #5, RB #6, RB #8, and RB #9 which are two RBs at both sides based on the RB #7 including the center frequency 2140. In order that the base station transmits the PSS/SSS in the 6 RB, the PSS/SSS may be transmitted even in the area corresponding to six subcarriers which are positioned at a close place to the center frequency among 12 subcarriers included in five RBs RB #5, RB #6, RB #7, RB #8, and RB #9 and the RB #4 2110 and the RB #10 2120 which are RBs positioned at both ends of the five RBs.

In the frequency band corresponding to the center 6 RB 2150 where the PSS/SSS is transmitted, a URS pattern which is newly defined so as not to collide with the PSS/SSS may be transmitted in another system band area as described above.

Figure 22:
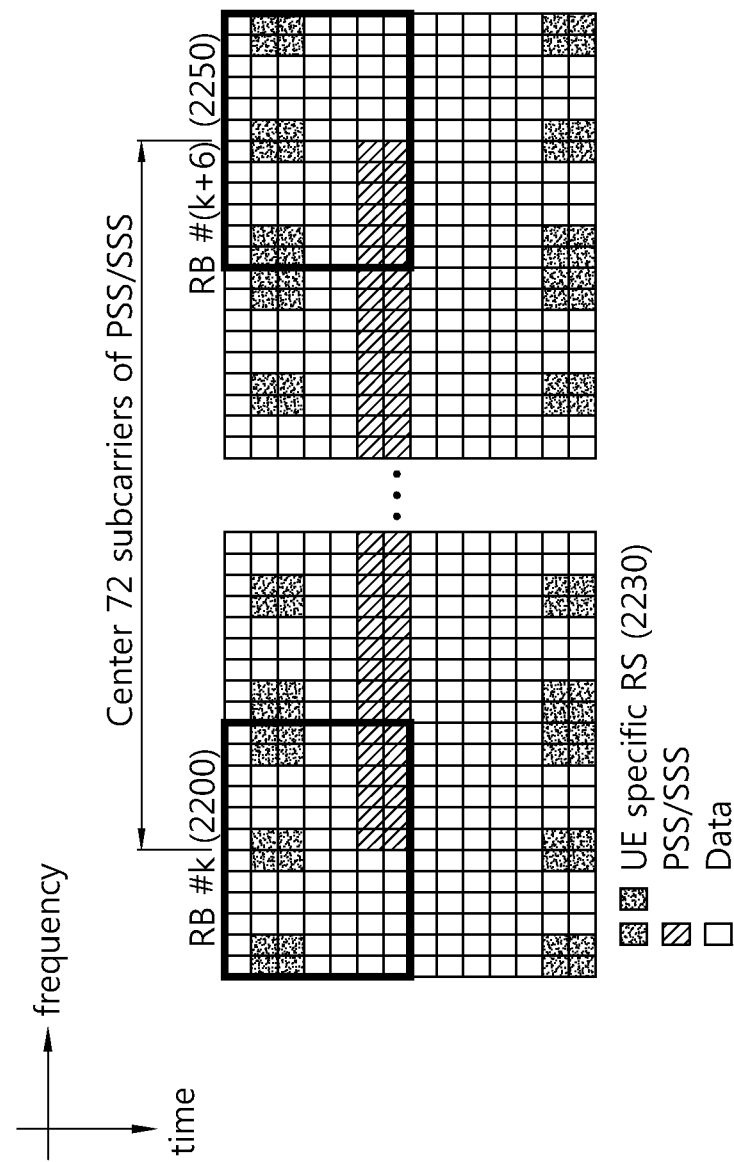
FIG. 22 is a conceptual diagram illustrating a method for transmitting a URS according to an embodiment of the present invention.

FIG. 22 is a schematic diagram illustrating a method of transmitting a URS according to the exemplary embodiment of the present invention.

FIG. 22 illustrates a method of transmitting a URS 2230 which is newly defined in a frequency resource where the PSS/SSS is transmitted.

Referring to FIG. 22, in the RB #k 2200 to the RB #k+6 2250, a new URS pattern 2230 may be defined and used so that the signal where the PSS/SSS is transmitted and the URS do not overlap with each other.

A frequency bandwidth transmitting the new URS pattern so as not to overlap with the resource in which the PSS/SSS is included may be determined like FIG. 23 below.

Figure 23:
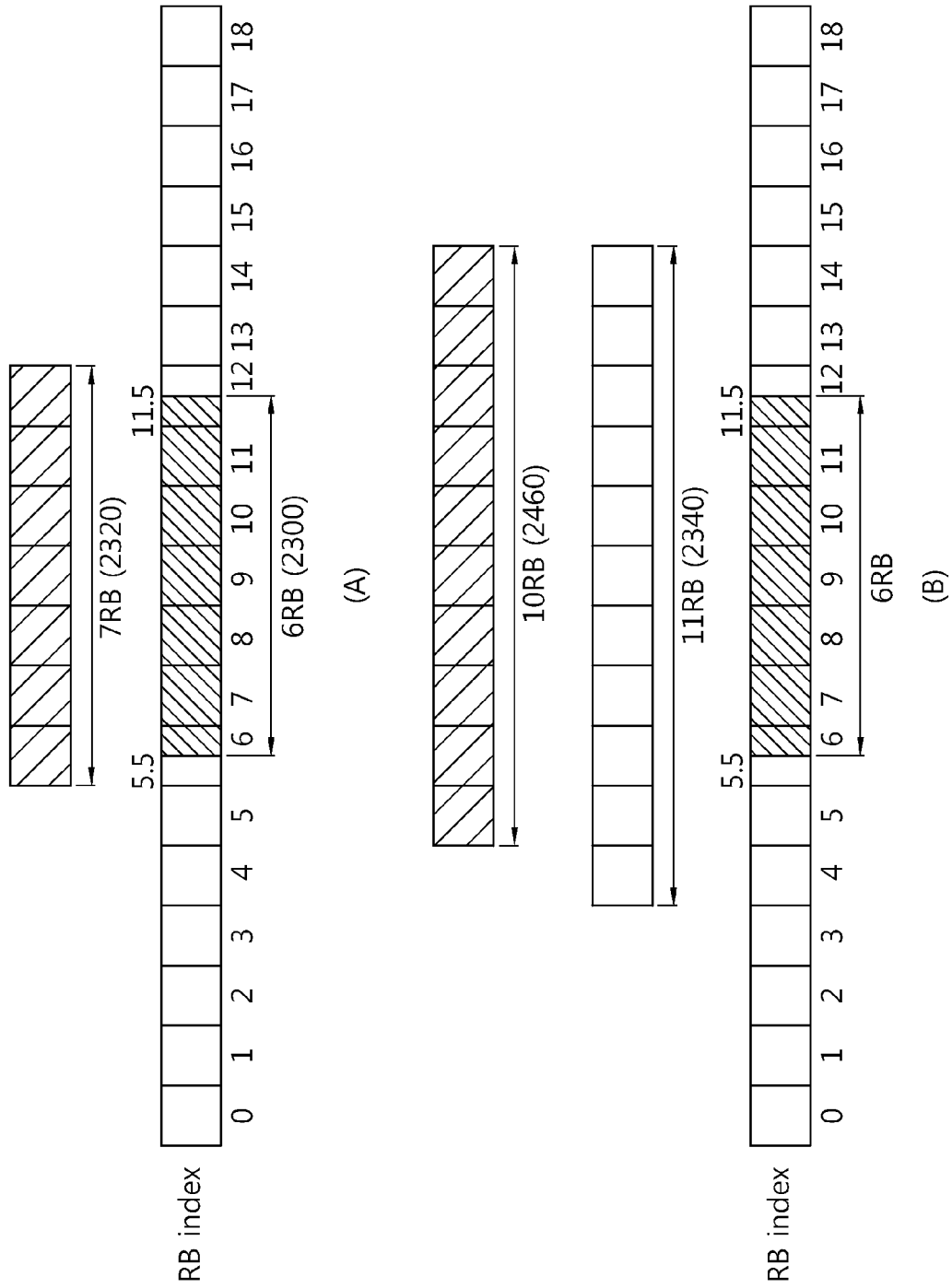
FIG. 23 is a conceptual diagram illustrating a URS transmission frequency bandwidth according to an embodiment of the present invention.

FIG. 23 is a schematic diagram illustrating a URS transmission frequency bandwidth according to the exemplary embodiment of the present invention.

Referring to FIG. 23(A), in a system having a system bandwidth corresponding to N (N: natural number) RBs, in the case of defining a URS pattern which is different from the URS in another frequency area within a system bandwidth in a frequency area corresponding to a center x (N>=x, x: natural number) RB, when a value of N mod 2 and a value of x mod 2 are not the same as each other, the URS is transmitted to the frequency area corresponding to a center (x+1) RB.

Like FIG. 23(A), when N is 19 and x is 6 (2300), 19 mod 2 has a value of 1 and 6 mod 2 is 0, which have different values. In this case, the demodulation performance of the PDSCH data transmitted from the corresponding RB may be enhanced by transmitting the URS in 7 RB areas 2320 which are x+1 RBs including x/2 RB at both sides based on the RB including the center frequency.

As another method of transmitting the URS, when a difference between N and x is 2 or more and x is larger than 6, the URS may be transmitted in an area corresponding to (x−1) RB including the center 6 RB where the PBCH or the PSS/SSS is transmitted. Here, mod means a modulo operation. Further, when values of N mod 2 and x mod 2 are the same as each other, the URS is transmitted in the frequency area corresponding to the center x RB.

Referring to FIG. 23(B), it may be assumed that N corresponds to 19 RB and x is 11 RB 2340. In this case, since the difference between N and x is 2 or more and x is larger than 6, the URS may be transmitted in the frequency band corresponding to the 10 RB 2460 based on the RB including the center frequency.

Further, as another method, by considering a PRB bundling size by a method of determining a URS transmission band, a URS pattern different from the URS defined in the PRB within the system bandwidth may be applied.

Figure 24:
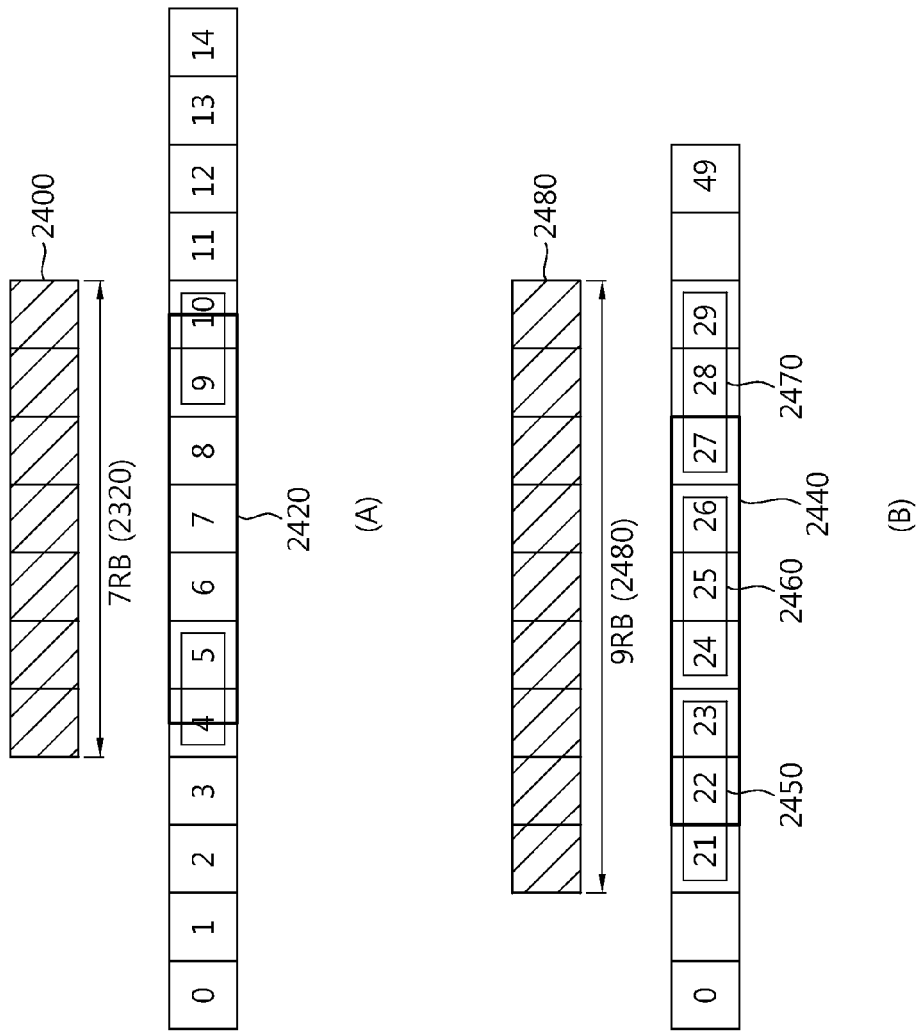
FIG. 24 is a conceptual diagram illustrating a URS transmission frequency bandwidth according to an embodiment of the present invention.

FIG. 24 is a schematic diagram illustrating a URS transmission frequency bandwidth according to the exemplary embodiment of the present invention.

Referring to FIG. 24(A), when the system bandwidth is 15 RB, the size of the PRB bundling may be set and used as 2 PRB. Since a resource block group (RBG) is 2 PRB, a URS pattern may be newly defined in 7 RB 2400 including the center 6 RB 2420.

Referring to FIG. 24(B), when the system bandwidth is 50 RB, the size of the PRB bundling is 3 RB. In this case, RB#21, RB#22, and RB#23 are the same RBG, and RB #27, RB #28, and RB #29 also belong to the same RBG. accordingly, in the frequency area corresponding to the entire 9 RB 2480 in which three RBGs 2450, 2460, and 2470 which are RBGs including the center 6 RB 2440 and the RBs on the boundary of the center 6 RB 2440, a URS pattern different from the URS within the system bandwidth may be defined and transmitted. In summary, when the URS is transmitted to only some bands based on the center frequency in N bands, if N is an odd number, the URS is transmitted to all of y RBs (y is an odd number), and if N is an even number, the URS may be transmitted to all of z RBs (z is an even number). Here, y and z are integers which are smaller than or equal to N. That is, the number of RBs in which the URS is transmitted may be changed according to whether the system bandwidth is a frequency bandwidth corresponding to even-numbered or odd numbered RBs. The RB in which the URS may be an RB which is newly indexed and defined.

With respect to the resource area in which the newly defined URS is transmitted when performing the PRB bundling, information on whether the PRB bundling is supported may be signaled from the base station to the UE. The UE may use demodulating the resource area where the URS is newly defined based on the information on whether the PRB bundling is supported.

Further, with respect to the resource area where the newly defined URS is transmitted, the PRB bundling may be newly defined and used unlike another resource area. For example, the RBs may be divided by using newly defined PRB indexing in only the RB where the newly defined URS is transmitted.

Figure 25:
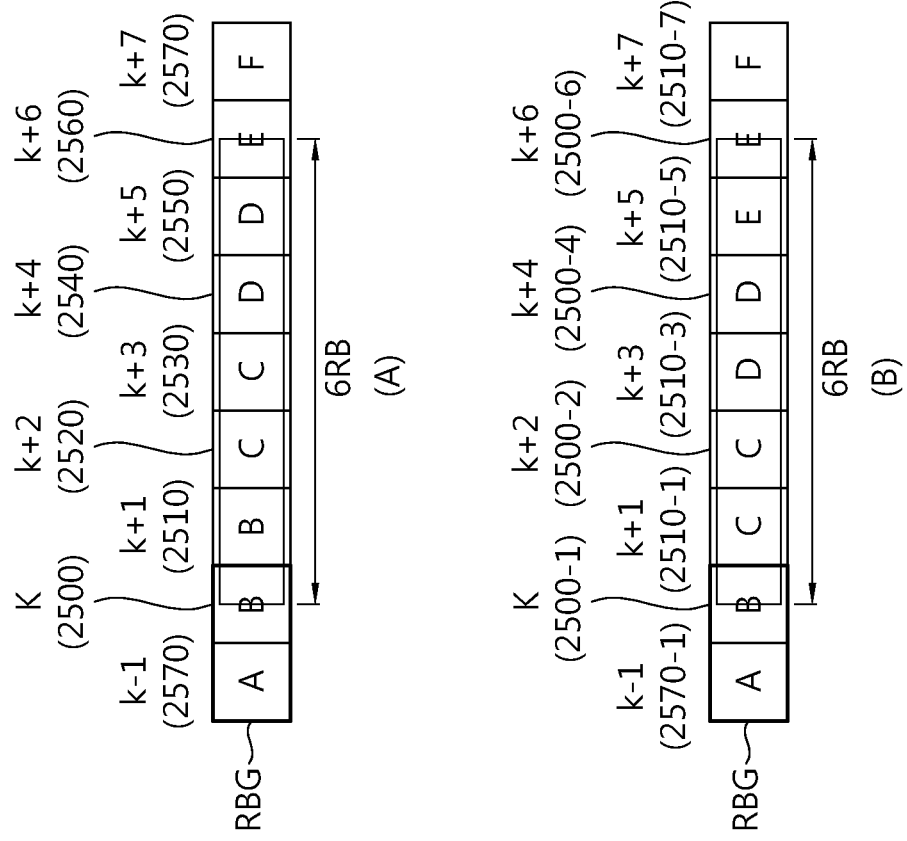
FIG. 25 is a conceptual diagram illustrating a PRB bundling method according to an embodiment of the present invention.

FIG. 25 is a schematic diagram illustrating a PRB bundling method according to the exemplary embodiment of the present invention.

According to the exemplary embodiment of the present invention, between the RB where the newly defined URS is transmitted and another RB, whether the PRB bundling is performed is determined to be signaled from the base station to the UE.

When the PRB bundling is performed between the RB where the newly defined URS is transmitted and another RB, the PRB bundling should be performed like an existing method. However, if the PRB bundling is not permitted, two cases below may be assumed according to a method of indexing the RB.

FIG. 25(A) illustrates a case where the indexing for the RB is newly performed in RB #k 2500 to RB #k+6 2560 including the newly defined URS.

In FIG. 25(A), a case of signaling to the UE assumes that PRB bundling for RB #k and RB #k+1 is not permitted.

It may be assumed that the PRB bundling size is 2 and the RB #k−1 2570 and RB #k 2500 belong to the same RBG. Since the PRB bundling is not permitted, the PRB bundling is not performed with respect to the RB #k−1 2570 and the RB #k 2500. Accordingly, the UE may perform the demodulation on the assumption that the RB #k−1 2570 and the RB #k 2500 are the RB to which different precodings are applied.

Further, the UE ma perform the demodulation on the assumption that the RB #k 500 and the RB #k+1 2510 which are the RBs transmitting the newly defined URS are the RBs to which the same precoding is applied. In the same manner, it may be assumed that the same precoding is applied to the RB #k+2 2520 and RB#k+3 2530 and the same precoding is applied to the RB #k+4 2540 and RB #k+5 2550. It may be assumed that in the RB #k+6 2560, independent precoding is performed.

FIG. 25(B) illustrates the case in which the indexing of the RB is performed in RB #k 2200 to RB #k+6 2250 including the newly defined URS similarly as the related art.

In FIG. 25(B), it is assumed that the base station signals to the UE that the PRB bundling of RB #k and RB #k+1 is not permitted.

The size of the PRB bundling may be assumed as 2 and the case in which RB #k−1 2570-1 and RB #k 2500-1 belong to the same RBG. Since the PRB bundling is not permitted, PRB bundling of RB #k−1 2570-1 and RB #k 2500-1 is not performed. Accordingly, the UE may perform demodulation while assuming that RB #k−1 2570-1 and RB #k 2500-1 are RBs to which different precodings are applied.

Further, the UE may perform demodulation by assuming that RB #k+1 2510-1 and RB #k+2 2520-1 which are RBs transmitting the newly defined URS are RBs to which the same precoding is applied. In the same manner, the UE may assume that the same precoding is applied to RB #k+3 2530-1 and RB #k+4 2540-1 and the same precoding is applied to RB #k+5 2550-1 and RB #k+6 2560-1.

In FIGS. 25(A) and 25(B), it is assumed that the base station signals to the UE that PRB bundling of RB #k and RB #k+1 is not permitted and in the case where whether the same precoding is applied to RB #k+5 and RB #k+6, the RBs to which the same precoding is applied may be determined based on RB #k+5 and RB #k+6.

In the case where the RB including the newly defined URS is included in the subframe in which the PSS/SSS is transmitted, whether PRB bundling is performed in the corresponding subframe or a PRB having a predetermined frequency band is determined to be signaled to the UE from the base station.

Figure 26:
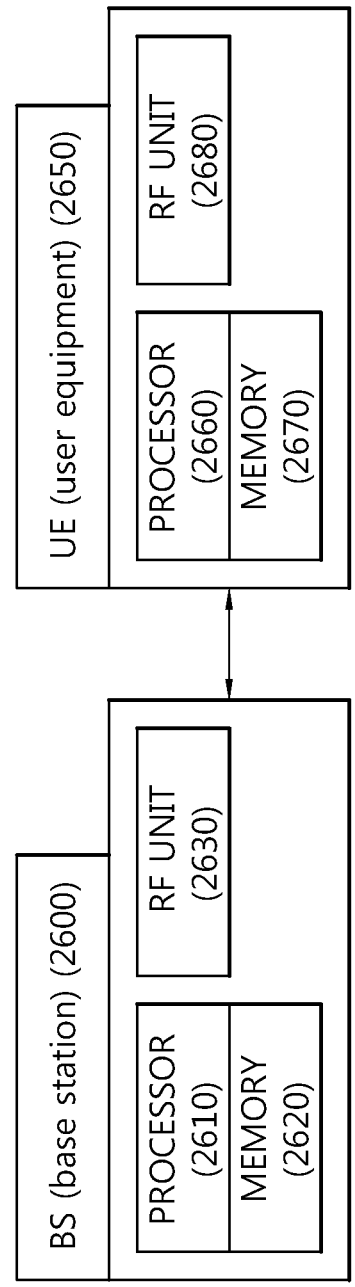
FIG. 26 is a block diagram illustrating a wireless communication system according to an embodiment of the present invention.

FIG. 26 is a block diagram illustrating a wireless communication system according to an embodiment of the present invention.

Referring to FIG. 6, the base station 2500 includes a processor 2610, a memory 2620, and a radio frequency (RF) unit 2630. The memory 2620 is connected with the processor 2610 to store various pieces of information for driving the processor 2610. The RF unit 2630 is connected with the processor 2610 to transmit and/or receive a radio signal resource. The processor 2610 implements a function, a process, and/or a method which are proposed. In the aforementioned embodiment, the operation of the base station may be implemented by the processor 2610.

For example, the processor 2610 may create a synchronization signal and create a URS so that the URS is transmitted to the UE through the center 6 RB in at least one OFDM symbol among OFDM symbols other than an OFDM symbol in which the synchronization signal is transmitted.

A wireless device 2650 includes a processor 2660, a memory 2670, and an RF unit 2680. The memory 2670 is connected with the processor 2660 to store various pieces of information for driving the processor 2660. The RF unit 2680 is connected with the processor 2660 to transmit and/or receive a radio signal. The processor 2660 implements a function, a process, and/or a method which are proposed. In the aforementioned embodiment, the operation of the wireless device may be implemented by the processor 2660.

For example, the processor 2660 may be implemented to receive the URS in at least one OFDM symbol among OFDM symbols other than an OFDM symbol in which a signal transmitted from the UE is transmitted.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for receiving a reference signal in a multi-antenna system, the method comprising:
    receiving a synchronization signal in a subframe, the subframe including a plurality of resource blocks (RBs) and a plurality of Orthogonal Frequency Division Multiplexing (OFDM) symbols;
    receiving a reference signal in the subframe; and
    determining a number of RBs included in one Precoding Resource block Group (PRG) based on a size of a total system bandwidth,
    wherein a number of RBs of the total system bandwidth is N,
    wherein N is a natural number,
    wherein the RBs included in the PRG include information to which same precoding is applied,
    wherein the synchronization signal includes a Primary Synchronized Signal (PSS) and a Secondary Synchronized Signal (SSS),
    wherein the PSS is received in a first OFDM symbol among the plurality of OFDM symbols,
    wherein the SSS is received in a second OFDM symbol among the plurality of OFDM symbols,
    wherein a cell identifier is acquired based on the PSS and the SSS,
    wherein the synchronization signal is received in center x RBs among the plurality of RBs,
    wherein x is natural number less than or equal to N,
    wherein the reference signal is received through a plurality of PRGs including the center x RBs in at least one OFDM symbol among the plurality of OFDM symbols other than the first and second OFDM symbols,
    wherein when a value of N mod 2 and a value of x mod 2 are different, the reference signal is received in a frequency area corresponding to a center (x+1) RB,
    wherein when the value of N mod 2 and the value of x mod 2 are same, the reference signal is received in a frequency area corresponding to a center x RB, and
    wherein if N is an odd number, the reference signal is received through an odd number of the plurality of PRGs and if N is an even number, the reference signal is received through an even number of the plurality of PRGs.

2. The method of claim 1, wherein:
the reference signal is created based on a user equipment (UE) identifier; and
when a size of the PRG is 2 physical resource blocks (PRB), the reference signal is received in a frequency band of 7 RBs including the N RBs.

3. The method of claim 1, wherein:
the reference signal is created based a user equipment (UE) identifier; and
when a size of the PRG is 3 physical resource blocks (PRB), the reference signal is received in a frequency band of 9 RBs including the N RBs.

4. The method of claim 1, wherein:
the subframe is a special frame;
the special frame includes a downlink pilot time slot (DwPTS), a guard period (GP), and an uplink pilot time slot (UpPTS) as a second subframe and a seventh subframe in a frame including 10 subframes;
the special subframe includes 12 OFDM symbols and 12 subcarriers,
the reference signal is received through at least one resource element set between a first resource element set and a second resource element set and is created based on a user equipment (UE) identifier;
the first resource element set is a first subcarrier, a sixth subcarrier, and an eleventh subcarrier in a 9-th OFDM symbol and a 10-th OFDM symbol; and
the second resource element set is a second subcarrier, a seventh subcarrier, and a twelfth subcarrier in the 9-th OFDM symbol and the 10-th OFDM symbol.

5. The method of claim 1, wherein:
the subframe is a special frame;
the special frame includes a downlink pilot time slot (DwPTS), a guard period (GP), and an uplink pilot time slot (UpPTS) as a second subframe and a seventh subframe in a frame including 10 subframes;
the special subframe includes 12 OFDM symbols and 12 subcarriers;
the reference signal is received through at least one resource element set between a first resource element set and a second resource element set and is created based on a user equipment (UE) identifier;
the first resource element set is a first subcarrier, a sixth subcarrier, and an eleventh subcarrier in a 6-th OFDM symbol and a 7-th OFDM symbol; and
the second resource element set is a second subcarrier, a seventh subcarrier, and a twelfth subcarrier in the 6-th OFDM symbol and the 7-th OFDM symbol.

6. The method of claim 1, further comprising:
receiving information regarding whether PRB bundling is performed in an RB including the reference signal.

7. A user equipment (UE) for receiving a reference signal in a wireless communication system, the UE comprising:
a radio frequency (RF) unit configured to transmit or receive a radio signal;
a memory unit configure to store the radio signal; and
a processor connected to the RF unit and the memory unit, the processor configured to
receive a synchronization signal in a subframe including a plurality of resource blocks (RBs) and a plurality of Orthogonal Frequency Division Multiplexing (OFDM);
receive the reference signal in the subframe; and
determine a number of RBs included in one Precoding Resource block Group (PRG) based on a size of a total system bandwidth,
wherein a number of RBs of the total system bandwidth is N,
wherein N is a natural number,
wherein the RBs included in the PRG include information to which same precoding is applied,
wherein the synchronization signal includes a Primary Synchronized Signal (PSS) and a Secondary Synchronized Signal (SSS),
wherein the PSS is received in a first OFDM symbol among the plurality of OFDM symbols,
wherein the SSS is received in a second OFDM symbol among the plurality of OFDM symbols,
wherein a cell identifier is acquired based on the PSS and the SSS,
wherein the synchronization signal is received in center x RBs among the plurality of RBs,
wherein x is natural number less than or equal to N,
wherein the reference signal is received through a plurality of PRGs including the center x RBs in at least one OFDM symbol among the plurality of OFDM symbols other than the first and second OFDM symbols,
wherein when a value of N mod 2 and a value of x mod 2 are different, the reference signal is received in a frequency area corresponding to a center (x+1) RB,
wherein when the value of N mod 2 and the value of x mod 2 are same, the reference signal is received in a frequency area corresponding to a center x RB, and
wherein if N is an odd number, the reference signal is received through an odd number of the plurality of PRGs and if N is an even number, the reference signal is received through an even number of the plurality of PRGs.

8. The UE of claim 7, wherein:
the reference signal is created based on a UE identifier; and
when a size of the PRG is 2 physical resource blocks (PRB), the reference signal is received in a frequency band of 7 RBs including the N RBs.

9. The UE of claim 7, wherein:
the reference signal is created based on a UE identifier; and
when a size of the PRG is 3 physical resource block (PRB), the reference signal is received in a frequency band of 9 RBs including the N RBs.

10. The UE of claim 7, wherein:
the subframe is the special frame;
the special frame includes a downlink pilot time slot (DwPTS), a guard period (GP), and an uplink pilot time slot (UpPTS) as the second subframe and the seventh subframe in a frame including 10 subframes;
the special subframe includes 12 OFDM symbols and 12 subcarriers;
the reference signal is received through at least one resource element set between the first resource element set and the second resource element set and is created based on a user equipment (UE) identifier;
the first resource element set is a first subcarrier, a sixth subcarrier, and an eleventh subcarrier in a 9-th OFDM symbol and a 10-th OFDM symbol; and
the second resource element set is a second subcarrier, a seventh subcarrier, and a twelfth subcarrier in the 9-th OFDM symbol and the 10-th OFDM symbol.

11. The UE of claim 7, wherein:
the subframe is the special frame;
the special frame includes a downlink pilot time slot (DwPTS), a guard period (GP), and an uplink pilot time slot (UpPTS) as a second subframe and a seventh subframe in a frame including 10 subframes;
the special subframe includes 12 OFDM symbols and 12 subcarriers;
the reference signal is received through at least one resource element set between a first resource element set and a second resource element set and is created based on a user equipment (UE) identifier;
the first resource element set is a first subcarrier, a sixth subcarrier, and an eleventh subcarrier in a 6-th OFDM symbol and a 7-th OFDM symbol; and;
the second resource element set is a second subcarrier, a seventh subcarrier, and a twelfth subcarrier in the 6-th OFDM symbol and the 7-th OFDM symbol.

12. The UE of claim 7,
wherein the processor is further configured to receive information regarding whether PRB bundling is performed in the RB including the reference signal.

* * * * *